US012811940B1

(12) United States Patent
Lapidous

(10) Patent No.: US 12,811,940 B1
(45) Date of Patent: Nov. 24, 2026

(54) DISTRIBUTED INTERACTIVE CONTROL OF ACCESS TO PROTECTED RESOURCES

(71) Applicant: ViewSpace Technologies Inc., Saratoga, CA (US)

(72) Inventor: Eugene Lapidous, Menlo Park, CA (US)

(73) Assignee: VIEWSPACE TECHNOLOGIES INC., Saratoga, CA (US)

( * ) Notice: Subject to any disclaimer, the term of this patent is extended or adjusted under 35 U.S.C. 154(b) by 347 days.

(21) Appl. No.: 18/501,870

(22) Filed: Nov. 3, 2023

Related U.S. Application Data

(60) Provisional application No. 63/532,626, filed on Aug. 14, 2023.

(51) Int. Cl.
*H04L 9/40* (2022.01)

(52) U.S. Cl.
CPC .................................... *H04L 63/10* (2013.01)

(58) Field of Classification Search
CPC ....................................................... H04L 63/10
See application file for complete search history.

(56) References Cited

U.S. PATENT DOCUMENTS

2013/0263230 A1* 10/2013 Gorodyansky ....... H04L 63/083 726/4
2015/0106832 A1* 4/2015 Yokota ............ H04N 21/41407 725/25
2016/0197933 A1* 7/2016 Lapidous ................ H04L 67/02 726/26
2017/0063940 A1* 3/2017 Lapidous ................ H04L 63/10
2019/0173849 A1* 6/2019 Lapidous ................ H04L 67/56

* cited by examiner

*Primary Examiner* — Chau Le
(74) *Attorney, Agent, or Firm* — David R. Stevens; Stevens Law Group

(57) ABSTRACT

A data exchange between a user's device and a resource over the computer network is detected and a request issued to the user to provide information related to the data exchange. A response is used to determine whether to allow or block one or more data exchanges. The data exchange can be paused or throttled until the response is received. A request may be issued to the user to perform one or more actions related to the detected data exchange, and, if the requested action was not performed, blocking one or more data exchanges. One or more conditions to allow or block the data exchanges may be set, enabling the user to acknowledge acceptance of these conditions, and blocking the data exchange if the user didn't provide this acknowledgment. A user may be prompted to remove unused conditions.

4 Claims, 17 Drawing Sheets

DISTRIBUTED INTERACTIVE CONTROL OF ACCESS TO PROTECTED RESOURCES

RELATED APPLICATIONS

This application claims the benefit of U.S. Provisional Application Ser. No. 63/532,626 filed Aug. 14, 2023 and entitled DISTRIBUTED INTERACTIVE CONTROL OF ACCESS TO PROTECTED RESOURCES, which is hereby incorporated herein by reference in its entirety.

FIELD OF THE INVENTION

The present invention generally relates to computer networking systems and methods. More particularly, the present invention relates to systems and methods for generating and applying access control rules for networked computing resources.

BACKGROUND OF THE INVENTION

There is an increasing need for effective solutions allowing users of enterprise networks to securely access their resources from remote locations. This need is caused both by the rapid increase in the number of remote workers and by transitioning from on-premise resources to cloud-based hosting.

Virtual Private Networks (VPNs) are no longer viable solutions for secure remote access because they grant full access to an entire network. In contrast, Zero Trust Network Access (ZTNA) solutions grant access only to specific services, resources, or applications. Each user is given the minimum levels of access—or permissions—needed to perform his/her job functions.

To limit user access, ZTNA solutions must include means for setting up, updating, and applying different access control rules for specific users or user groups, such as user roles, depending on their minimal access requirements. This makes ZTNA significantly more difficult to set up and maintain in comparison with VPN. ZTNA setup requires specifying sets of individual resources (IP addresses, domains, file names, etc.) and access types (ports, protocols, etc.) that should be allowed for each user or user group with different access needs. These sets should be updated after every change in the network configuration (adding, removing, or moving protected resource or network) and in the user needs (task or position change, etc.). This requires significant efforts by enterprises with a large number of protected resources and workers needing access. It also makes ZTNA impractical for many small and medium businesses (SMBs) who can't afford to spend time on continues updates of the access rules.

Transitioning from VPN to ZTNA can sometimes make the workers less productive and even affect their morale. Human errors in setting the access permissions, or delays in updating them after the change of the network configuration or worker needs, can impair the workflow. Some workers, especially highly skilled SMB employees, can be offended by treating them as untrusted users.

These factors create the need for new access control solutions that would simplify the setup and maintenance of the access permissions, decrease workflow interruptions and increase willing acceptance of access limitations while keeping the access permissions at least as strict as in the currently used ZTNA solutions.

SUMMARY OF THE INVENTION

In one aspect, a method for controlling access includes: detecting, by a computer system, at least part of a first data exchange between a device and a resource over a computer network, the device being one of one or more first devices of a first user and the resource being one of one or more resources accessible over the computer network; issuing, by the computer system, a request to the first user to provide information related to the first data exchange; receiving, by the computer system, a response to the request from the first user; and using, by the computer system, the response to determine whether to allow or block one or more data exchanges over the computer network between the one or more resources and the one or more first devices, the one or more data exchanges including the first data exchange.

In some embodiments, the method further includes: before detecting the first data exchange, setting, by the computer system, one or more first access conditions controlling allowing or blocking of the one or more data exchanges; and after receiving the response, using, by the computer system, the response to determine whether to change the one or more first access conditions for the one or more first devices. In some embodiments, the method further includes: issuing, by the computer system, the request in response to the first data exchange being blocked according to the one or more first access conditions.

In some embodiments, the method further includes: detecting, by the computer system, a second data exchange from a second device of a second user; issuing, by the computer system, a second request to the second user to provide information related to the second data exchange; determining, by the computer system, that the second user did not respond to the second request; and in response to determining that the second user did not respond to the second request, blocking, by the computer system, the second data exchange.

In some embodiments, the method further includes: before detecting the first data exchange, setting, by the computer system, one or more first access conditions to request information from a user about the one or more data exchanges; and issuing, by the computer system, the request if the first data exchange matches the one or more first access conditions.

In some embodiments, the method further includes after receiving the response, changing, by the computer system, the one or more first access conditions for data exchanges of the one or more data exchanges subsequent to the first data exchange.

In some embodiments, the method further includes: after detecting the first data exchange and before receiving the response, one of pausing or throttling, by the computer system, the first data exchange; after receiving the response, evaluating, by the computer system, whether the first data exchange should be allowed; and in response to determining that the first data exchange should be allowed, ceasing, by the computer system, the one of pausing or throttling of the first data exchange.

In some embodiments, the response contains information about a reason to allow the one or more data exchanges. In some embodiments, the information about the reason includes a reference to an assigned project or task related to the one or more data exchanges. In some embodiments, the response contains information about one or more requested conditions to allow or block the one or more data exchanges. In some embodiments, the response contains details of one or more encrypted data exchanges without containing decryption keys for the one or more encrypted data exchanges. In some embodiments, the details of the one or more encrypted data exchanges contain at least part of an encrypted resource identifier associated with the first data exchange.

In some embodiments, the method further includes: detecting, by the computer system, a second data exchange from a second device of a second user; determining, by the computer system, that the second user previously provided information related to the second data exchange; and in response to determining that the second user previously provided information related to the second data exchange, refraining, by the computer system, from issuing a request to provide information related to the second data exchange.

In another aspect, a computing system includes: one or more processing devices; and one or more memory devices operably coupled to the one or more processing devices. The one or more memory devices store executable code that, when executed by the one or more processing devices, cause the one or more processing devices to: set one or more first conditions to allow or block one or more data exchanges over a computer network between one or more user devices and one or more resources; detect at least part of a first data exchange of the one or more data exchanges between a first device of the one or more user devices and a resource of the one or more resources over the computer network; issue a request to a first user of the first device to provide information related to the first data exchange; and if a response to the request is received from the first user, use the response to determine whether to change the one or more first conditions with respect to the first user.

In some embodiments, the executable code, when executed by the one or more processing devices, further causes the one or more processing devices to: if no response is received from the first user, block the first data exchange.

In another aspect, a non-transitory computer-readable medium stores executable code that, when executed by one or more processing devices, causes the one or more processing devices to perform a method comprising: setting one or more first conditions to allow or block one or more data exchanges over a computer network between one or more user devices and one or more resources; detecting at least part of a first data exchange of the one or more data exchanges between a first user device of the one or more user devices and a resource of the one or more resources over the computer network; issuing a request to a first user of the first user device to provide information related to the first data exchange; and if a response to the request is received from the first user, use the response to determine whether to change the one or more first conditions with respect to the first user.

In some embodiments, the executable code, when executed by the one or more processing devices, further causes the one or more processing devices to: if no response is received from the first user, block the first data exchange.

In another aspect, a method for controlling access to networked resources includes: detecting, by a computer system, at least part of a first data exchange between a first user device and a resource over a computer network; one of pausing or throttling, by the computer system, the first data exchange; sending, by the computer system, a request to a first user associated with the first user device, the request being related to the first data exchange; receiving, by the computer system, a response to the request from the first user; determining, by the computer system, using the response, that the first data exchange is allowed to proceed; and in response to determining that the first data exchange is allowed to proceed, ceasing, by the computer system, the at least one of pausing or throttling of the first data exchange.

In some embodiments, the request comprises a request to the first user to provide information related to the first data exchange.

In some embodiments, the method further includes: setting, by the computer system, one or more first access conditions to send the request to the first user; and sending, by the computer system, the request and performing the one of pausing or throttling the first data exchange in response to the first data exchange matching the one or more first access conditions.

In some embodiments, the method further includes: detecting, by the computer system, a second data exchange from a second device of a second user; issuing, by the computer system, a second request to the second user to provide information related to the second data exchange; determining, by the computer system, that the second user did not respond to the second request; and in response to determining that the second user did not respond to the second request, blocking, by the computer system, the second data exchange.

In some embodiments, the method further includes: determining, by the computer system, whether to allow or block the first data exchange; and sending, by the computer system, the request and one of pausing or throttling the first data exchange in response to determining that the first data exchange should be blocked.

In another aspect, a computing system includes one or more processing devices; and one or more memory devices operably coupled to the one or more processing devices. The one or more memory devices store executable code that, when executed by the one or more processing devices, cause the one or more processing devices to: detect at least part of a first data exchange between a first user device associated with a first user and a resource over a computer network; pause or throttle the first data exchange; send a request to the first user, the request being related to the first data exchange; receive a response; determine to allow the first data exchange to proceed based on the response; and in response to determining to allow the first data exchange to proceed, resume the first data exchange.

In some embodiments, the request comprises a request to the first user to provide information related to the first data exchange.

In another aspect, a non-transitory computer-readable medium storing executable code that, when executed by one or more processing devices, causes the one or more processing devices to perform a method comprising: detecting, by a computer system, at least part of a first data exchange between a first user device associated with a first user and a resource over a computer network; one of pausing or throttling, by the computer system, the first data exchange; sending, by the computer system, a request to the first user, the request being related to the first data exchange; receiving, by the computer system, a response; determining, by the computer system, to allow the first data exchange to proceed based on the response; and in response to determining to allow the first data exchange to proceed, resuming, by the computer system, the first data exchange.

In some embodiments, the request comprises a request to the first user to provide information related to the first data exchange.

In another aspect, a method for controlling access includes: detecting, by a computer system, at least part of a first data exchange between a first user device and a first resource over a computer network, the first user device being one of one or more first user devices of a first user; issuing, by the computer system, a request to the first user to perform one or more actions related to the first data exchange; determining, by the computer system, that the one or more actions were not performed; and in response to determining that the one or more actions were not performed, blocking, by the computer system, one or more data exchanges over the computer network between the one or more first user devices and one or more resources, the one or more resources including the first resource and the one or more data exchanges including the first data exchange.

In some embodiments, the method further includes: before detecting the first data exchange, setting, by the computer system, one or more first access conditions to requesting the first user to perform the one or more actions; and issuing the request in response to determining that the first data exchange matches the one or more first access conditions.

In some embodiments, the method further includes: issuing the request to perform the one or more actions before determining whether the first data exchange should be allowed or blocked.

In some embodiments, the one or more actions include at least one of authentication, subscription, and an acknowledgment of one or more first access conditions.

In some embodiments, the method further includes: one of pausing or throttling, by the computer system, the first data exchange before determining that the action was performed, and then resuming one of pausing or throttling after determining that the action was performed.

In some embodiments, the method further includes: detecting, by the computer system, at least part of a second data exchange between a second user device and a second resource over a computer network, the second user device being one of one or more second user devices of a second user; determining that the second user has performed the one or more actions prior to detecting the at least the part of the second data exchange; and in response to determining that the second user has performed the one or more actions prior to detecting the at least the part of the second data exchange, refraining from issuing a second request to perform the one or more actions to the second user.

In another aspect, a computing system includes: one or more processing devices; and one or more memory devices operably coupled to the one or more processing devices, the one or more memory devices storing executable code that, when executed by the one or more processing devices, cause the one or more processing devices to: detect at least part of a first data exchange between a first user device and a first resource over a computer network, the first user device being one of one or more first user devices of a first user; issue a request to the first user to perform one or more actions related to the first data exchange; determine that the one or more actions were not performed; and in response to determining that the one or more actions were not performed, block one or more data exchanges over the computer network between the one or more first user devices and one or more resources, the one or more resources including the first resource and the one or more data exchanges including the first data exchange.

In another aspect, a non-transitory computer-readable medium storing executable code that, when executed by one or more processing devices, causes the one or more processing devices to perform a method comprising: detecting at least part of a first data exchange between a first user device and a first resource over a computer network, the first user device being one of one or more first user devices of a first user; issuing a request to the first user to perform one or more actions related to the first data exchange, determining that the one or more actions were not performed; and in response to determining that the one or more actions were not performed, blocking one or more data exchanges over the computer network between the one or more first user devices and one or more resources, the one or more resources including the first resource and the one or more data exchanges including the first data exchange.

In another aspect, a method for controlling access includes: setting, by a computer system, one or more first access conditions to allow or block one or more data exchanges over a computer network between one or more devices of a first user and one or more resources; enabling, by the computer system, the first user to acknowledge acceptance of one or more first access conditions; detecting, by the computer system, at least part of a first data exchange of the one or more data exchanges between a first user device of the one or more devices and a resource of the one or more resources, the first data exchange matching the one or more first access conditions; determining, by the computer system, that the first user has not accepted the one or more first access conditions; and in response to determining that the first user has not accepted the one or more first access conditions, blocking, by the computer system, the one or more data exchanges, the one or more data exchanges being allowed according to the one or more first access conditions.

In some embodiments, enabling the first user to acknowledge acceptance of the one or more first access conditions includes providing the first user with descriptions of the one or more first access conditions. In some embodiments, the descriptions of the one or more first access conditions are provided to the first user before the first data exchange is detected.

In another aspect, a computing system includes: one or more processing devices; and one or more memory devices operably coupled to the one or more processing devices, the one or more memory devices storing executable code that, when executed by the one or more processing devices, cause the one or more processing devices to: set one or more first access conditions to allow or block one or more data exchanges over a computer network between one or more devices of a first user and one or more resources; enable the first user to acknowledge acceptance of one or more first access conditions; detect at least part of a first data exchange of the one or more data exchanges between a first user device of the one or more devices and a resource of the one or more resources, the first data exchange matching the one or more first access conditions; evaluate whether the first user has accepted the one or more first access conditions; and if the first user has not accepted the one or more first access conditions, block the one or more data exchanges, the one or more data exchanges being allowed according to the one or more first access conditions.

In some embodiments, the executable code, when executed by the one or more processing devices, further causes the one or more processing devices to enable the first user to acknowledge acceptance of the one or more first access conditions by sending a message requesting to acknowledge acceptance of the one or more first access conditions after detecting the first data exchange.

In some embodiments, the executable code, when executed by the one or more processing devices, further causes the one or more processing devices to: one of pause or throttle the first data exchange before sending the message; and resume the first data exchange after the one of pausing or throttling the first data exchange if the first user has accepted the one or more first access conditions.

In some embodiments, the executable code, when executed by the one or more processing devices, further causes the one or more processing devices to: refrain from sending the message to the first user if the first user has already acknowledged acceptance of the one or more first access conditions related to the first data exchange.

In some embodiments, the executable code, when executed by the one or more processing devices, further causes the one or more processing devices to: enable the first user to acknowledge acceptance of one or more first access conditions by providing one or more user interface elements configured to trigger the acknowledgment of the one or more first access conditions.

In some embodiments, the executable code, when executed by the one or more processing devices, further causes the one or more processing devices to: if the first user has accepted the one or more first access conditions, use the one or more first access conditions to determine whether to allow or block the first data exchange.

In another aspect, a non-transitory computer-readable medium storing executable code that, when executed by one or more processing devices, causes the one or more processing devices to perform a method comprising: setting one or more first access conditions to allow or block one or more data exchanges over a computer network between one or more devices of a first user and one or more resources; enabling the first user to acknowledge acceptance of one or more first access conditions; detecting at least part of a first data exchange of the one or more data exchanges between a first user device of the one or more devices and a resource of the one or more resources, the first data exchange matching the one or more first access conditions; determining that the first user has not accepted the one or more first access conditions; and in response to determining that the first user has not accepted the one or more first access conditions, blocking the one or more data exchanges, the one or more data exchanges being allowed according to the one or more first access conditions.

In another aspect, a method for controlling access to networked resources includes: setting, by a computer system, a plurality of first access conditions to allow one or more data exchanges over a computer network between one or more first user devices of a first user and one or more resources; tracking, by the computer system, a first portion of the plurality of first access conditions that are used to allow the one or more data exchanges over a specified period; detecting, by the computer system, that a second portion of the plurality of first access conditions were not used to allow any of the one or more data exchanges during the specified period; in response to detecting that the second portion of the plurality of first access conditions were not used to allow any of the one or more data exchanges during the specified period, issuing, by the computer system, a request to the first user to provide information related to the second portion of the plurality of first access conditions; receiving, by the computer system, a response to the request from the first user; and using, by the computer system, the response, to determine whether to keep or change one or more of the plurality of first access conditions.

In some embodiments, changing one or more of the plurality of first access conditions comprises removing, by the computer system, the second portion of the plurality of first access conditions from the plurality of first access conditions.

In some embodiments, changing one or more of the plurality of first access conditions comprises replacing, by the computer system, the second portion of the plurality of first access conditions from the plurality of first access conditions with less permissive conditions.

In some embodiments, the request to provide information related to one or more unused conditions includes a request for user feedback on whether the second portion of the plurality of first access conditions can be removed.

In some embodiments, the second portion of the plurality of first access conditions are selected from the group consisting of hostname, domain name, IP address, port, and protocol.

In another aspect, a computing system includes: one or more processing devices; and one or more memory devices operably coupled to the one or more processing devices, the one or more memory devices storing executable code that, when executed by the one or more processing devices, cause the one or more processing devices to: set a plurality of first access conditions to allow one or more data exchanges over a computer network between one or more first user devices of a first user and one or more resources; track a first portion of the plurality of first access conditions that are used to allow the one or more data exchanges over a specified period; detect that a second portion of the plurality of first access conditions were not used to allow any of the one or more data exchanges during the specified period; in response to detecting that the second portion of the plurality of first access conditions were not used to allow any of the one or more data exchanges during the specified period, issue a request to the first user to provide information related to the second portion of the plurality of first access conditions; receive a response to the request from the first user; and use the response, to determine whether to keep or change one or more of the plurality of first access conditions.

In some embodiments, the executable code, when executed by the one or more processing devices further causes the one or more processing devices to: if no response to the request is received from the first user, remove the second portion of the plurality of first access conditions from the plurality of first access conditions.

In another aspect, a non-transitory computer-readable medium stores executable code that, when executed by one or more processing devices, causes the one or more processing devices to perform a method comprising: setting a plurality of first access conditions to allow one or more data exchanges over a computer network between one or more first user devices of a first user and one or more resources; tracking a first portion of the plurality of first access conditions that are used to allow the one or more data exchanges over a specified period; detecting that a second portion of the plurality of first access conditions were not used to allow any of the one or more data exchanges during the specified period; in response to detecting that the second portion of the plurality of first access conditions were not used to allow any of the one or more data exchanges during the specified period, issuing a request to the first user to provide information related to the second portion of the plurality of first access conditions; receiving a response to the request from the first user; and using the response, to determine whether to keep or change one or more of the plurality of first access conditions.

In another aspect, a non-transitory computer-readable medium storing executable code that, when executed by one or more processing devices, causes the one or more processing devices to perform a method comprising: receiving a message from a first user containing a request to set one or more first access conditions for allowing one or more data exchanges between a user device of the first user and one or more resources over a computer network; if the one or more data exchanges are allowed according to one or more second access conditions for one or more other users from a first group of users, automatically approving the request; and if the request is not allowed according to the one or more second access conditions, forwarding information from the request to one or more human parties to decide whether to approve the request.

In some embodiments, the first group of users includes the first user. In some embodiments, the first group of users includes users assigned one or more roles for role-based access control. In some embodiments, the first group of users includes users assigned one or more first roles with first role-based access conditions that are the same or less permissive than second role-based access conditions for one or more second roles assigned to the first user. In some embodiments, the first group of users includes one or more users who previously issued one or more requests to set the one or more second access conditions at least as permissive as the one or more first access conditions, the one or more requests being previously approved.

In some embodiments, the executable code, when executed by the one or more processing devices, further causes the one or more processing devices to perform the method by: approving the one or more first access conditions for the first user in response to the one or more first access conditions being the same or less permissive than the one or more of the second access conditions allowed for another user. In another aspect, a. computing system includes: one or more processing devices; and one or more memory devices operably coupled to the one or more processing devices, the one or more memory devices storing executable code that, when executed by the one or more processing devices, cause the one or more processing devices to: receive a message from a first user containing a request to set one or more first access conditions for allowing one or more data exchanges between a user device of the first user and one or more resources over a computer network; if the one or more data exchanges are allowed according to one or more second access conditions for one or more other users from a first group of users, automatically approve the request; and if the request is not allowed according to the one or more second access conditions, forward information from the request to one or more human parties to decide whether to approve the request.

In another aspect, a non-transitory computer-readable medium storing executable code that, when executed by one or more processing devices, causes the one or more processing devices to perform a method comprising: detecting at least part of a first data exchange between a first user device of a first user and a resource over a computer network; before deciding whether to block the first data exchange, receiving a message from the first user containing a user request to set one or more first access conditions allowing one or more data exchanges including the first data exchange; evaluating whether deciding whether to block the first data exchange can be performed automatically; if deciding whether to block the first data exchange cannot be performed automatically, forwarding information derived from the message to one or more human parties, and blocking the first data exchange before feedback from a human party of the one or more human parties is received; and if deciding whether to block the first data exchange can be performed automatically and the one or more first access conditions allowing the first data exchange are automatically approved, continuing the first data exchange without blocking.

In some embodiments, blocking the first data exchange before the feedback from a human party is received comprises terminating a network connection associated with the first data exchange.

In some embodiments, the message from the first user contains information justifying the user request; and evaluating whether deciding whether to block the first data exchange can be performed automatically comprises issuing a verification request over the computer network to verify validity of at least part of the information justifying the user request.

In some embodiments, evaluating whether deciding whether to block the first data exchange can be performed automatically comprises: obtaining one or more scores associated with the first user or the first user device before receiving the message; and using these scores to determine whether the user request can be automatically approved.

In some embodiments, at least one of the scores comprises an estimation of a security risk of the first user or the first user device; and the method further comprises increasing a likelihood that deciding whether to block the first data exchange can be performed automatically with decrease in the security risk.

In some embodiments, evaluating whether deciding whether to block the first data exchange can be performed automatically comprises: setting one or more second access conditions for making automatic decisions about the user request; and automatically approving the user request if data exchanges allowed by the one or more first access conditions are also allowed by the one or more second access conditions.

In another aspect, a computing system includes: one or more processing devices; and one or more memory devices operably coupled to the one or more processing devices, the one or more memory devices storing executable code that, when executed by the one or more processing devices, cause the one or more processing devices to: detect at least part of a first data exchange between a first user device of a first user and a resource over a computer network; before deciding whether to block the first data exchange, receive a message from the first user containing a user request to set one or more first access conditions allowing one or more data exchanges including the first data exchange; evaluate whether deciding whether to block the first data exchange can be performed automatically; if deciding whether to block the first data exchange cannot be performed automatically, forward information derived from the message to one or more human parties, and blocking the first data exchange before feedback from a human party is received; and if deciding whether to block the first data exchange can be performed automatically and the one or more first access conditions allowing the first data exchange are automatically approved, continue the first data exchange without blocking.

In another aspect, a non-transitory computer-readable medium stores executable code that, when executed by the one or more processing devices, causes the one or more processing devices to perform a method comprising: receiving a user message from a first user containing a request to set one or more first access conditions to allow one or more data exchanges between a first user device of the first user and one or more resources over a computer network; evaluating whether the user message includes one or more first identifiers of one or more human parties who can approve the request; and if the user message includes the one or more first identifiers, forwarding information contained in the user message to the one or more human parties.

In some embodiments, the executable code, when executed by the one or more processing devices, further causes the one or more processing devices to: if the one or more first identifiers of the one or more human parties who can approve the request are not included in the user message, forward the information contained in the user message to one or more human parties identified before the user message was received.

In some embodiments, determining whether the user message includes one or more first identifiers of the one or more human parties who can approve the request comprises checking whether the one or more first identifiers are valid.

In some embodiments, checking whether the one or more first identifiers are valid includes determining whether the one or more human parties are a member of a team of the first user.

In another aspect, a computing system includes: one or more processing devices; and one or more memory devices operably coupled to the one or more processing devices, the one or more memory devices storing executable code that, when executed by the one or more processing devices, cause the one or more processing devices to: receive a user message from a first user containing a request to set one or more first access conditions to allow one or more data exchanges between a first user device of the first user and one or more resources over a computer network; evaluate whether the user message includes one or more first identifiers of one or more human parties who can approve the request; and if the user message includes the one or more first identifiers, forward information contained in the user message to the one or more human parties.

In another aspect, a method for controlling access includes: receiving, by a computer system, a message from a first user device of a first user, the message containing a request to set one or more first access conditions to allow one or more first data exchanges between the first user device and one or more resources over a computer network; setting, by the computer system, one or more second access conditions to allow one or more second data exchanges between the first user device and the one or more resources over the computer network, the one or more second access conditions being more permissive than the one or more first access conditions; and refraining, by the computer system, from informing the first user that the one or more second access conditions were allowed.

In some embodiments, the method further includes: informing, by the computer system, the first user that the request was approved without specifying the one or more second access conditions.

In another aspect, a computing system includes: one or more processing devices; and one or more memory devices operably coupled to the one or more processing devices, the one or more memory devices storing executable code that, when executed by the one or more processing devices, cause the one or more processing devices to: receive a message from a first user device of a first user, the message containing a request to set one or more first access conditions to allow one or more first data exchanges between the first user device and one or more resources over a computer network; set one or more second access conditions to allow one or more second data exchanges between the first user device and the one or more resources over the computer network, the one or more second access conditions being more permissive than the one or more first access conditions; and refrain from informing the first user that the one or more second access conditions were allowed.

In another aspect, a non-transitory computer-readable medium stores executable code that, when executed by one or more processing devices, causes the one or more processing devices to perform a method comprising: receiving a message from a first user device of a first user, the message containing a request to set one or more first access conditions to allow one or more first data exchanges between the first user device and one or more resources over a computer network; setting one or more second access conditions to allow one or more second data exchanges between the first user device and the one or more resources over the computer network, the one or more second access conditions being more permissive than the one or more first access conditions; and refraining from informing the first user that the one or more second access conditions were allowed.

In another aspect, a non-transitory computer-readable medium storing executable code that, when executed by one or more processing devices, causes the one or more processing devices to perform a method comprising: setting one or more first access conditions for allowing or blocking one or more data exchanges initiated by users from a first group over a computer network, setting one or more second access conditions different from the one or more first access conditions for a first portion of the users from the first group but not for a second portion of the users from the first group; detecting at least part of a first data exchange initiated by a first user of the first group; evaluating whether access conditions of the first user are different from the one or more first access conditions; if (a) the access conditions of the first user are not different from the one or more first access conditions or (b) the access conditions of the first user do not allow or block the first data exchange, using the one or more first access conditions to determine whether to allow or block the first data exchange.

In some embodiments, setting the one or more second access conditions for the first portion of the users comprises, for each user of the first portion of the users: receiving a message from the each user, the message including a request to set the one or more second access conditions for allowing or blocking the one or more data exchanges; determining that setting the one or more second access conditions for the each user should be approved; and in response to determining that setting the one or more second access conditions for the each user should be approved, setting one or more third access conditions for the each user, the one or more third access conditions being different from the one or more first access conditions.

In some embodiments, the one or more third access conditions are same as the one or more second access conditions. In some embodiments, the executable code, when executed by the one or more processing devices, further cause the one or more processing devices to perform the method by: adding the first portion of the users from the first group to a second group; and evaluating whether the access conditions of the first user are different from the one or more first access conditions by evaluating whether the first user belongs to the second group.

In some embodiments, the executable code, when executed by the one or more processing devices, further cause the one or more processing devices to perform the method by: evaluating whether the access conditions of the first user match one or more parameters of the first data exchange; if any of the access conditions of the first user match one or more parameters of the first data exchange and if any of the one or more parameters caused allowing or blocking the first data exchange, terminating evaluation of the first data exchange; and if none of the access conditions of the first user match the one or more parameters of the first data exchange or if none of the access conditions of the first user caused allowing or blocking of the first data exchange, performing one or more actions related to the first data exchange.

In some embodiments, the first group is associated with a same role assigned for role-based access control.

In another aspect, a computing system includes: one or more processing devices; and one or more memory devices operably coupled to the one or more processing devices, the one or more memory devices storing executable code that, when executed by the one or more processing devices, cause the one or more processing devices to: set one or more first access conditions for allowing or blocking data exchanges initiated by users from a first group over a computer network, set one or more second access conditions different from the one or more first access conditions for a first portion of the users from the first group but not for a second portion of the users from the first group; detect at least part of a first data exchange initiated by a first user of the first group; evaluate whether access conditions of the first user are different from the one or more first access conditions; and if (a) the access conditions of the first user are not different from the one or more first access conditions or (b) the access conditions of the first user do not allow or block the first data exchange, using the one or more first access conditions to determine whether to allow or block the first data exchange.

In some embodiments, setting the one or more second access conditions for the first portion of the users comprises, for each user of the first portion of the users: receiving a message from the each user, the message including a request to set one or more third access conditions for allowing or blocking the one or more data exchanges, the one or more third access conditions being different from the one or more first access condition; determining that setting the one or more second access conditions for the each user should be approved; and in response to determining that setting the one or more second access conditions for the each user should be approved, setting the one or more second access conditions for the each user, the one or more second access conditions being different from the one or more first access conditions. In some embodiments the one or more third access conditions are same as the one or more second access conditions.

Some embodiments further comprise adding the first portion of the users from the first group to a second group and evaluating whether the access conditions of the first user are different from the one or more first access conditions by evaluating whether the first user belongs to the second group.

In some embodiments, the executable code, when executed by the one or more processing devices, further causes the one or more processing devices to perform the method by: evaluating whether the access conditions of the first user match one or more parameters of the first data exchange; if any of the access conditions of the first user match the one or more parameters of the first data exchange and if any of the the one or more parameters caused allowing or blocking the first data exchange, terminating evaluation of the first data exchange; and if none of the access conditions of the first user match the one or more parameters of the first data exchange or if none of the access conditions of the first user caused allowing or blocking of the first data exchange: evaluating whether the one or more first access conditions match the one or more parameters of the first data exchange; and if any of the one or more first access conditions match the one or more parameters of the first data exchange, performing one or more actions related to the first data exchange. In some embodiments, the first group is associated with a same role assigned for role-based access control.

In another aspect, a computing system includes one or more processing devices and one or more memory devices operably coupled to the one or more processing devices. The one or more memory devices store executable code that, when executed by the one or more processing devices, cause the one or more processing devices to: set one or more first access conditions for allowing or blocking data exchanges initiated by users from a first group over a computer network, set one or more second access conditions different from the one or more first access conditions for a first portion of the users from the first group but not for a second portion of the users from the first group; detect at least part of a first data exchange initiated by a first user of the first group; evaluate whether access conditions of the first user are different from the one or more first access conditions; and if (a) the access conditions of the first user are not different from the one or more first access conditions or (b) the access conditions of the first user do not allow or block the first data exchange, use the one or more first access conditions to determine whether to allow or block the first data exchange.

BRIEF DESCRIPTION OF DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION OF THE INVENTION

The terms "embodiment, implementation, instance, or example" used below refer, correspondingly, to the embodiment, implementation, instance, or example of the present invention.

As stated, the present invention relates to systems and methods for generating and applying access control rules for networked computing resources. Specifically, various embodiments are described that address the problems of the current approaches, such as Zero Trust Network Access (ZTNA) and Secure Access Service Edge (SASE): complexity of set up and maintenance, workflow slow-downs and interruptions, and treating company employees as untrusted security risks.

In some embodiments, a user is enabled to provide information about a data exchange between the user's device and a networked resource after initiating this data exchange. In some instances, the information is used to allow or block the data exchange. In some implementations, the information is used to set access conditions to allow or block the data exchange and possibly one or more other data exchanges. In some instances, the information includes at least one of a reason or justification for the data exchange (task name, etc.), requested access conditions, and identifiers of accessed content items. In some implementations, the data exchange is paused until this information is received and resumed if the data exchange can be automatically allowed.

The described embodiments transform the setup and maintenance of the access control for the networked resources to an interactive process, distributed between multiple users while enabling these users to contribute to the network security and reducing workflow interruptions.

Embodiments presented in FIGS. 1, 2*a*, 2*b*, 3,4*a*, 4*b*, 5, 6*a* and 6*b* depict example flowcharts and user interfaces that may be used to obtain and process the user's information about the data exchange after the data exchange was initiated by that user.

Figure 1:
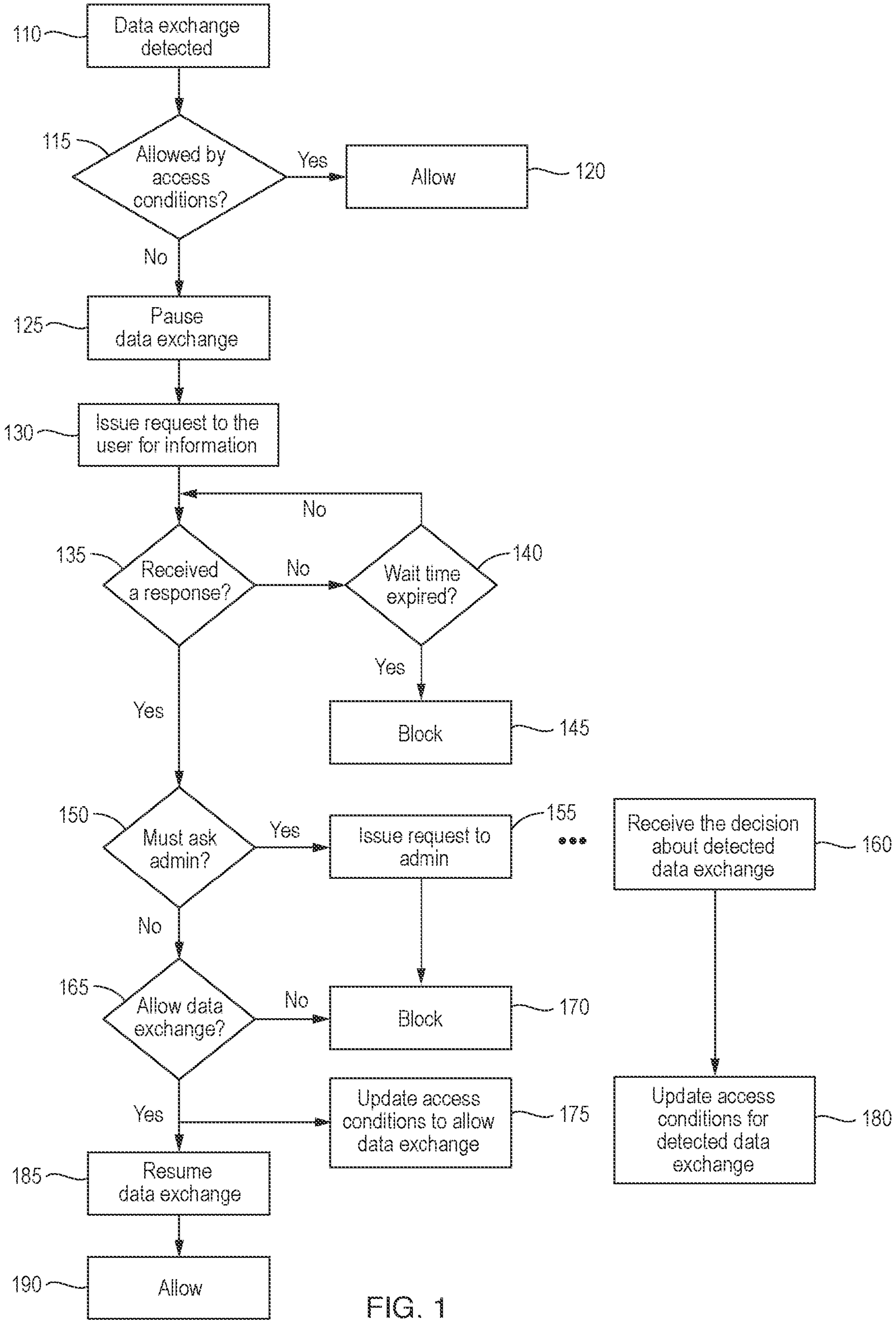
FIG. 1 is a flowchart illustrating a method for enabling a user to request access conditions for allowing data exchange over a computer network between the user's device and a networked resource in accordance with an embodiment of the present invention.

FIG. 1 is a flowchart of a method for enabling the user to provide information about the user-initiated data exchange, illustrating certain aspects of various embodiments disclosed herein. The method of FIG. 1 and other methods described herein may be executed by a computer system (hereinafter "the system"), such as computer system having some or all of the attributes of a computer system 1400 described below with respect to FIG. 14.

In the depicted embodiment, the system detects 110 the data exchange between the user's device and a resource over the computer network and, after checking 115 against the pre-exiting access conditions, either allows 120 the data exchange to proceed or pauses 125 it and issues 130 a request to the user to provide information about the detected data exchange. The system then waits 135 for a response and, if no response is found 140 to have been received within a predefined time, blocks 145 the data exchange. If the response is received within the predefined time, the system determines 150 whether the decision to allow the data exchange requires input from the human party (in this example, an IT Administrator, referred to in the description below as Admin). If this input is found to be needed at step 150, the system issues 155 a request for a decision, the request including information received from the user and blocks 170 the data exchange without waiting for the response. After receiving 160 the Admin's response, the system updates 180 access conditions for one or more data exchanges, including the detected data exchange from step 110.

If the system determines 150 that the decision to allow or block the data exchange can be made automatically, it then uses the information received from the user to make 165 this decision and either blocks 170 the data exchange or resumes 185 the data exchange and allows 190 it to continue. If the data exchange that was blocked 115 by the pre-existing access conditions is allowed to continue, the system updates 175 the access conditions affecting the data exchange that will be used as the pre-existing access conditions in subsequent iterations of the method of FIG. 1.

In some embodiments, the pre-existing access conditions are set to block any data exchange initiated by the user unless it is approved in response to the user's request. This helps to simplify the transition to the implementations described herein from current ZTNA solutions having "default-to-deny" policies for new users and resources.

In the other embodiments, the pre-existing access conditions are set to allow at least some data exchanges. In some implementations, these pre-existing access conditions are specified by the Admin during the set-up. In one example, all data exchanges initiated by the user are allowed unless specifically blocked ("default-to-allow"). This helps to simplify the transition from legacy VPN solutions that grant full access to all network resources. In some implementations, a request is issued to the user to provide information related to the detected data exchange even if the data exchange is allowed by the initial conditions. In some instances, such data exchange is blocked if the user's response isn't received (e.g., within a timeout period) or requires Admin's approval. The pre-existing access conditions may be updated to block at least some previously allowed data exchanges.

In some embodiments, the step of detecting 110 the data exchange comprises detecting at least part of the data exchange comprising one or more network packets. In some implementations, detecting at least part of the data exchange comprises inspecting headers or payload of one or more of the network packets, for instance by using iptables or nftables. In some implementations, the network packets comprising the data exchange have headers with the same protocol and "IP address: port" pairs (ports may be omitted for some protocols, such as ICMP). Examples of "IP address: port" pairs include, for example: IP: port of user's device and IP: port of the requested resource. For upstream packets, "IP address: port" pairs may include source IP: port associated with the user's device and destination IP: port associated with the resource. For downstream packets, "IP address: port" pairs may include source IP: port associated with the resource and destination IP: port associated with the user's device. In some instances, detecting 110 the data exchange comprises detecting only upstream or only downstream packets. In some examples, detecting 110 the data exchange comprises detecting only upstream packets or only downstream packets after the connection is established. In some implementations, the network packets comprising the data exchange with the networked resource are encapsulated within an encrypted VPN tunnel. The system determines whether to allow or block the data exchange after the packets exit the tunnel. In some of these implementations, the IP address of the user's device is a virtual IP address sent inside the tunnel and decrypted when the packets exit the tunnel.

In some implementations, detection 110 of the data exchange begins after receiving a first packet of the data exchange, or the first upstream and downstream packets. In one example, the data exchange is detected 110, the request is issued 130 to the user and the data exchange is paused 125 after receiving the first packet from the user's device, to prevent sending any traffic to the requested resource until the access is allowed according to the method of FIG. 1. In the other implementations, detection 110 of the data exchange begins after receiving a plurality of network packets of the data exchange. In one example, detection of the data exchange doesn't start until the total traffic through the tunnel exceeds a daily threshold.

In some embodiments, the step of detecting 110 at least part of the data exchange is repeatedly applied to a plurality of the network packets comprising the data exchange. In some implementations, the processing steps vary for different network packets comprising the data exchange. In some instances, the pre-existing access conditions vary for the different network packets of the data exchange. In one example, the pre-existing access conditions allow data exchanges with payloads below a pre-defined size. For example, in some embodiments, the data exchange is paused 125, and the request is issued 130 to the user only after detecting a first network packet transmitted in the data exchange following the total amount of data exchanged in the data exchange reaching the pre-defined size.

In some embodiments, the data exchange between the user's device and the networked resources is forwarded through a proxy server, for instance by using SOCKS, HTTP2 or HTTP3 protocol. In some implementations, detecting 110 at least part of the data exchange comprises inspecting parameters of a proxied connection or the content of one or more headers associated with the proxied connection, for instance selected from the group of CONNECT, SNI, HOST, and GET headers.

In some embodiments, a request to the user to provide information related to the detected data exchange is issued 130 if at least part of the data exchange matches one or more of the pre-existing access conditions, or if the pre-existing access conditions to allow or block the data exchange were set in a pre-defined way. In some instances, the request is issued only if one or more of the pre-existing access conditions matching the data exchange were set by default, without being changed by a human party. In other instances, the request is issued 130 if one or more of the pre-existing access conditions matching the data exchange were marked by the Admin as requiring the user's feedback to be activated. In some implementations, the request is issued 130 only if the user information about the same or a similar data exchange was not previously received. In some other implementations, the request for information about the same or similar data exchange is issued 130 again if a specific time interval from a previous request has expired or a previous response was invalidated for another reason, such as an increase in a risk score associated with the user based on prior behavior of the user. In some instances, multiple requests to the user to provide information related to the detected data exchange are issued 130 during the same data exchange if different parts of this data exchange match different conditions of the pre-existing access conditions. In one example, a first request is issued 130 at the beginning of the data exchange, to obtain the reason for the access and a second request is issued 130 after an amount of exchanged data exceeds the pre-defined size, the second request being a request to obtain a full URL of the networked resource requested in the data exchange.

In some instances, the request to provide information related to the detected data exchange is sent to the same user's device that initiated the data exchange. In other instances, the request is issued 130 to a different user's device—for example, the data exchange could be initiated by the user's laptop, while the request is issued 130 to the user's mobile phone.

In some embodiments, either the pre-existing access conditions or access conditions set after processing the user request, or both, are applied to some but not all of the user's devices. In one example, a first data exchange is initiated by a first device of the user having a higher risk score, for instance, having an older version of an operating system. The first data exchange initiated by the first device has a higher probability of invoking issuance 155 of a request for Admin approval or of being blocked 150 than a second data exchange initiated by a second device of the user having a lower risk score than the first device.

In some implementations, pausing 125 the data exchange is implemented by dropping or buffering upstream or downstream packets instead of allowing the packets to reach their destinations. However, the system may close the network connection associated with the detected data exchange if the packet flow is interrupted for a time longer than the system-specific TCP or UDP timeout (for instance, 30 to 60 s). To prevent closing this connection if the maximal wait time for the user's response (for instance, 5 min) exceeds the corresponding system timeout, in some implementations, the data exchange is throttled instead of paused, such as by decreasing the packet send rate but keeping the time between the network packets sent to their destinations below the system-specific timeout. The packets with higher rates are either dropped (for instance, by using the iptables extension module "limit"), simulating low-quality connection, or slowly released from the buffer (for instance, by using a proxy to buffer all incoming packets from the networked resource). In some examples, pausing or throttling includes changing congestion control parameters, for instance, decreasing the size of a congestion window, or changing the flow or parameters of TCP ACK packets to simulate packet losses.

In some other embodiments, the request issued 130 to the user to provide information related to the detected data exchange is issued 130 without pausing or throttling the data exchange. In one example, the data exchange continues at a normal speed (i.e., no artificial throttling) after the request is issued until the amount of the downloaded or uploaded traffic exceeds the pre-defined size, or the wait time for the user response is found 140 to have expired. In some instances, only large (e.g., exceeding the pre-defined size) downloads are paused to prevent unauthorized data exfiltration or only large uploads are paused to prevent the upload of unauthorized content. In some instances, if the data exchange is completed before the user's response is received, the update of the access conditions affects subsequent data exchanges of the user.

In some implementations, instead of issuing 130 the request for information about the detected data exchange, the system sends a message informing the user that the data exchange can't be allowed until the user provides the information about this data exchange directly to a human party, for instance, by sending an email to the Admin.

In some implementations, the system verifies that the networked resource is accessible before performing one or more steps following the detection 110 of the data exchange. In one instance, the system considers the networked resource to be accessible if the user's device receives one or more response packets from the networked resource within a pre-defined time. In another instance, the system initiates its own data exchange with the networked resource to determine its accessibility (for instance, if the networked resource isn't supposed to send the response packets). In some embodiments, the system sends a message to the user that the networked resource is not accessible instead of or in addition to issuing 130 the request for information about the data exchange referencing the networked resource. In some instances, this message includes updated information about the networked resource, for instance, its new IP address.

In some instances, if the system needs to block 145 the data exchange, it does so by dropping the data exchange's packets instead of forwarding them to the destination (e.g., the networked resource or the user's device), for instance by using the iptables DROP command. In this case, the user's device that initiated the data exchange may delay dropping the connection until after a connection timeout. The user may therefore not be informed that the connection was deliberately blocked as opposed to being interrupted due to a networking glitch, which helps to obscure real access control rules defined by the pre-existing access conditions or access conditions evaluated at steps 150 and/or 165. In other instances, the system blocks the data exchange by terminating the network connection associated with the data exchange. In one implementation, the system initiates termination of the network connection by sending an error message to the source (e.g., the user's device), for instance by using the iptables REJECT command. In this case, the connection is terminated faster. However, the user may see an error message informing the user that the connection was deliberately blocked. In one embodiment, the system uses a different method to block the data exchange if the data exchange is not allowed by the access conditions as compared to when the user's request is forwarded to a human party, e.g., the Admin, for feedback. In one instance, the system drops the packets if the data exchange is not allowed while sending an error message and terminating the connection without waiting for the tine out period if the request is forwarded to the human party for feedback. In the latter case, informing the user that the access was deliberately blocked would not help the attacker to discover the real access rules (they could change after the Admin's decision), while decreasing the wait time until the connection is terminated.

Figure 2A:
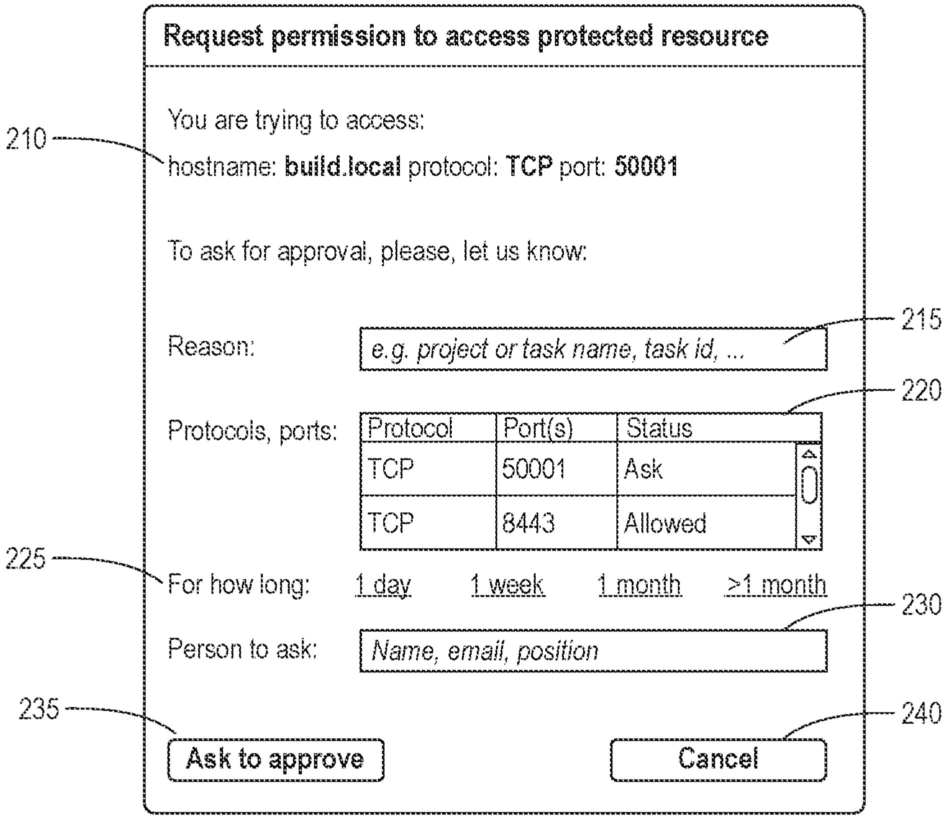
FIG. 2*a* illustrates a message containing a user interface for providing information about a user-initiated data exchange using a specified protocol and port and for asking to allow this data exchange to continue in accordance with an embodiment of the present invention.

FIG. 2*a* illustrates a message that may be transmitted by the system to a user, such as to the user's device. The message contains a user interface (UI) for providing information about the user-initiated data exchange using the specified protocol and port, and for asking to allow this data exchange to continue.

In the depicted embodiment, the message is displayed to the user, e.g., transmitted to the user's device and displayed thereon, after the system issues a request to the user to provide this information, for instance in step 130 in FIG. 1. In this embodiment, the message identifies the requested networked resource 210 by its hostname, protocol, and port. The user is asked to provide the reason 215 for allowing the data exchange. The reason, explanation, or justification may include the full or partial project name, task ID, assigner's name, or other information that could be used to justify the need for the data exchange. In some embodiments, after receiving the user's response the system attempts to verify that at least part of the provided information is valid—for instance, whether the task ID exists—and then blocks the data exchange if this verification fails. UI element 220 displays previously allowed protocols and ports for the same hostname (in this example, for the web access to the build server over HTTPS), and the protocol and port that need to be allowed for the current data exchange (in this example, for the access to the build server by the user agent). The depicted UI also contains elements 225 to receive input of the duration of the requested permission and an input field 230 to receive input of a person that could approve the request—for instance, the user's team lead or a manager who assigned the task. The user can select a button 235 to send the information input to the UI of FIG. 2*a* to the Admin and ask for approval, or select button 240 to transmit refusal to respond to the request to the computer system, which, in some instances, would terminate the data exchange in response.

In the depicted embodiment, the user is enabled to specify the approver's name to decrease the workload for the Admin, speed up the approval process, and decrease the probability of errors: the user's team lead often has a better understanding of the access conditions needed to perform the tasks assigned to the user. In other embodiments, the system obtains the approver's name from records associated with the user who initiated the data exchange.

The message illustrated by FIG. 2*a* and the other messages described herein can be presented in different ways, depending on the selected message channel, the software installed on the user's device, and the capabilities of its operating system. In some implementations, the message is presented inside the application installed on the user's device or in a separate window, opened from that application or from the notification displayed by the web browser. In some instances, the message is delivered in multiple stages, for example by sending a push notification or an SMS message to the user's mobile phone, enabled to trigger opening of the application and downloading the body of the message from the server. In other instances, the message is delivered as an email containing the link to the website with the body of the message.

The message illustrated by FIG. 2*a*, and the other messages described in the present invention are only examples of the possible UI designs and the types of information that should be provided with the user's response to the request issued at step 130. In some implementations, the UI element 220 is modified to enable adding requested ports, protocols, or other parameters, such as bytes upstream/downstream. In some instances, the presented message omits some of the UI elements displayed in FIG. 2*a* or adds UI elements to specify information related to other requested access conditions—for instance, whether the access should be permitted during the weekend or outside of working hours.

In some instances, the information provided in the user's response is used for purposes different from allowing or blocking the detected data exchange according to the method of FIG. 1. In some examples, the reason is logged for subsequent analysis without affecting the immediate decision of whether to allow or block the current data exchange.

Figure 2B:
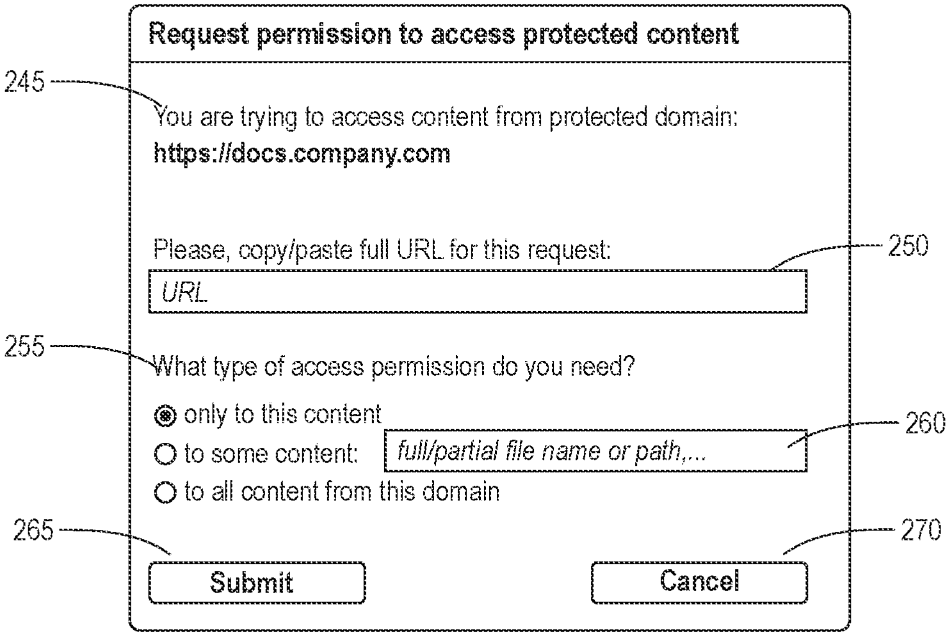
FIG. 2*b* illustrates a message containing a user interface for providing information about the user-initiated data exchange with the protected content items and for asking to allow this data exchange to continue in accordance with an embodiment of the present invention.

FIG. 2*b* illustrates a message containing a user interface for providing information about the user-initiated data exchange with the protected content items, and for asking to allow this data exchange to continue.

In the depicted embodiment, the message is displayed to the user after the computing system issues a request for that user to provide information related to the detected data exchange, for instance at step 130 in FIG. 1. In this embodiment, the message includes an identifier 245 of the data exchange by the full domain name and protocol (HTTPS) thereof. In this example, the system that detected the data exchange does not have access to an encryption key of the data exchange and can't decrypt the full URL of the requested content. Instead, the message sent to the user asks to specify the full URL, for instance, by copying it from the browser's address bar and pasting it into the text field 250.

In some embodiments, after receiving the user's response, the system verifies whether the provided URL is at least partially valid—for instance, whether the path contained in the URL exists, and blocks the data exchange if the provided URL is invalid. In some instances, an application installed on the user's device fills the URL field automatically, for example by using a browser extension, or by locally decrypting an HTTPS request without sending the decryption key over the computer network to the system.

In the depicted embodiment, the message also provides a multiple-choice UI element 255 to receive input of a scope of the requested access: only to the content addressed during the current data exchange (for instance, full URL), or to content items matching one or more partial identifiers typed in the text field 260, or to all content from the detected domain. Selecting "Submit" 265 triggers sending the response to the system; selecting "Cancel" 270 in some instances causes blocking of the detected data exchange.

In some embodiments, the message UI contains additional input fields, such as the estimated size of the download or the upload during the current data exchange. Instead of requiring copy/pasting of the full URL, in some instances query portion of the URL can be omitted. In some implementations, field 250 may remain empty if the user fills field 260 and selects the "to some content" option.

In some implementations, the system already knows the full URL, file name, or path for the detected data exchange—for instance, if the data exchange was not encrypted—and only asks the user to provide other information, such as the reason for initiating the data exchange or the scope of requested access.

In some instances, the full or partial URL provided in the user's response is used for purposes different from allowing or blocking the detected data exchange. In some examples, the provided URL is logged for subsequent analysis without affecting the immediate decision of whether to allow or block the current data exchange.

In some embodiments, the user is enabled to perform one or more actions required to allow the data exchange between the user's device and the networked resource after initiating this data exchange. In some implementations, the required actions are selected from the group of additional authentication, subscription to the premium service, and acknowledgment of the pre-set access conditions. In some instances, the system that detected the data exchange issues a request to the user to perform one or more actions related to this data exchange and resumes the data exchange after receiving proof that the requested action was performed. In some implementations, the user is required to perform one or more actions only after initiating the data exchanges matching specific conditions. This helps to reduce workflow interruptions; for instance, the user is not asked to perform multi-factor authentication (MFA) until initiating the data exchange with privileged content; the user can perform this action while the data exchange is paused and then continue it without repeating the content request.

Figure 3:
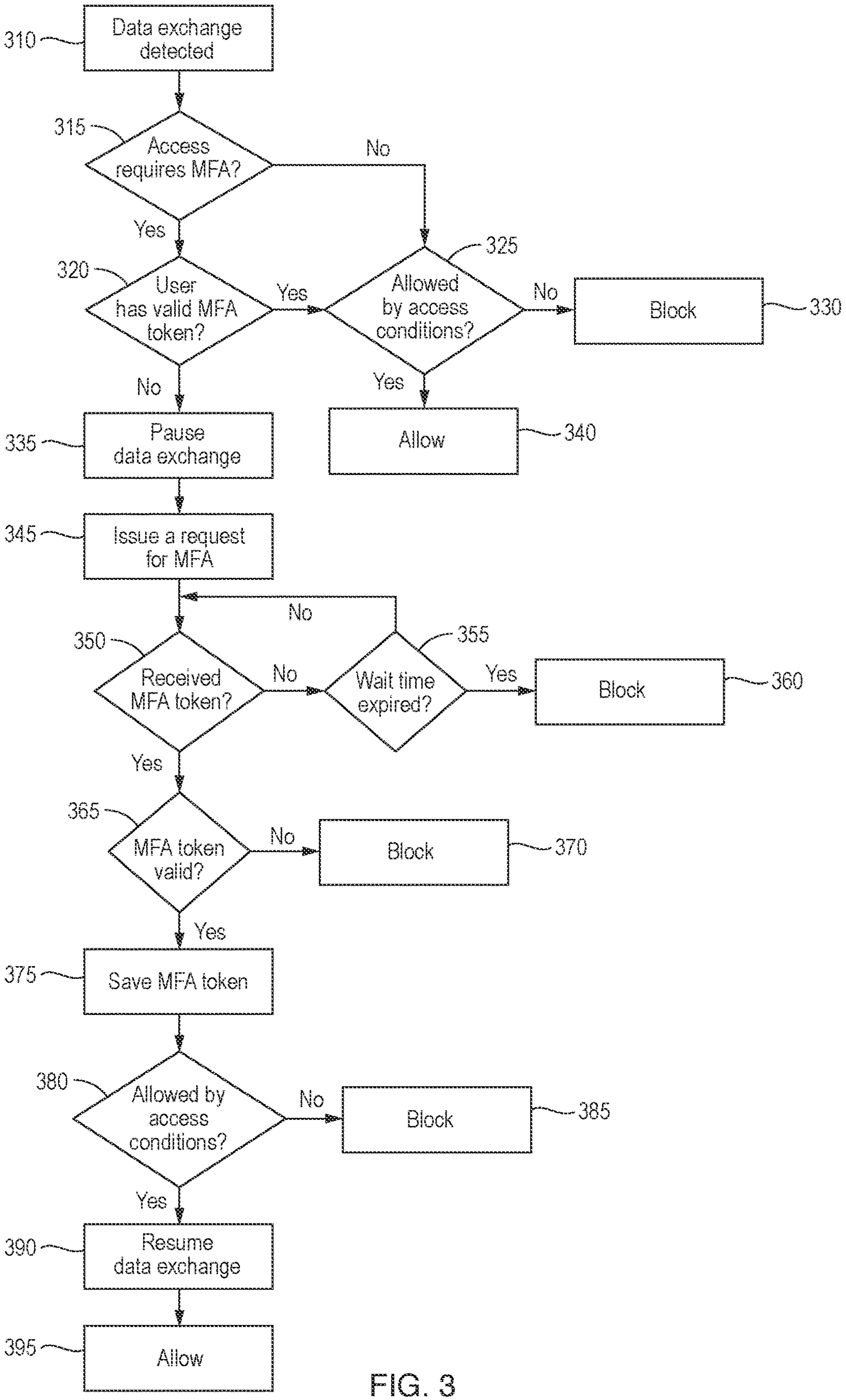
FIG. 3 is a flowchart illustrating a method for enabling the user to perform an action required to allow the data exchange over the computer network between the user's device and the networked resource after initiating this data exchange in accordance with an embodiment of the present invention.

FIG. 3 is a flowchart illustrating a method for enabling the user to perform an action required to allow a data exchange over the computer network between the user's device and the networked resource after initiating the data exchange.

In the depicted embodiment, this action is multi-factor authentication (MFA). The computing system detects 310 a data exchange between the user's device and a networked resource over the computer network and then checks 315 whether this data exchange requires the user to be authenticated with MFA according to a policy associated with the networked resource. If MFA is required, the system checks 320 whether the action was already performed (for instance, the user has submitted a valid MFA token with or before a request to start the data exchange). If MFA is not needed or was already performed, the system checks 325 whether the data exchange is allowed by existing access conditions. The system blocks 330 the data exchange if not allowed according to the access conditions or allows 340 the data exchange to proceed if allowed according to the access conditions.

In the depicted embodiment, if the user action is required but there is no valid proof that it was already performed, the computing system pauses 335 the data exchange and then issues 345 a request to the user to perform the requested action. If the proof of performing the requested action (in this example, providing the MFA token) isn't provided before a timeout period is found 355 to have expired, the data exchange is blocked 360. If the proof is received 350 within the timeout period, the proof is checked 365 for validity. Invalid proof results in blocking 370 of the data exchange. If the proof is valid, the valid proof is saved 375 for the check 315 in one or more subsequent iterations of the method of FIG. 3 for other data exchanges. After receiving the valid proof, the system checks 380 whether the data exchange is allowed by the existing access conditions and then blocks 385 the data exchange if not allowed by the access condition or resumes 390 the paused data exchange and allows 395 the data exchange to proceed if allowed by the access conditions.

In this embodiment, the user is asked to perform additional authentication even if the access to requested resource is not allowed by existing access conditions. In some instances, the user is asked to perform additional authentication if the data exchange request matches one or more pre-defined conditions (for instance, uses a specific port and protocol) even if the requested content or resource doesn't exist. This prevents the unauthorized user from discovering unknown network resources (for instance, by issuing network scans) and finding which of these resources require MFA.

In the other embodiments, the user is asked to perform the requested action only after checking that the data exchange matching the existing conditions is allowed, or after checking that the requested networked resource exists. This is useful, for instance, to streamline the workflow for trusted users allowed to perform the network scans.

In some implementations, verifying that the required action was performed comprises receiving and validating the token encrypted or signed by the service used to perform this action. In one example, checking that the MFA token is valid at step 365 comprises decrypting or verifying the signature of a JSON Web Token (JWT) generated by an Identity Provider by using a known public key of the Identity Provider, and checking the token's expiration time.

In some instances, the user's device obtains proof that the requested action was performed and sends the proof in response to the request issued at step 345. In one example, the user obtains an MFA token from the Identity Provider and includes it with the response. In other instances, the proof is received from the service used to perform the requested action. In one example, the user is asked to initiate MFA with an Identity Provider, which then sends a callback with an MFA token to the system that detected the data exchange at step 310. In another example, verifying that the required action was performed comprises sending a request over the computer network, asking the service used to perform these actions (for instance, an Identity Provider) whether it was performed by the specified user or user device.

Figure 4A:
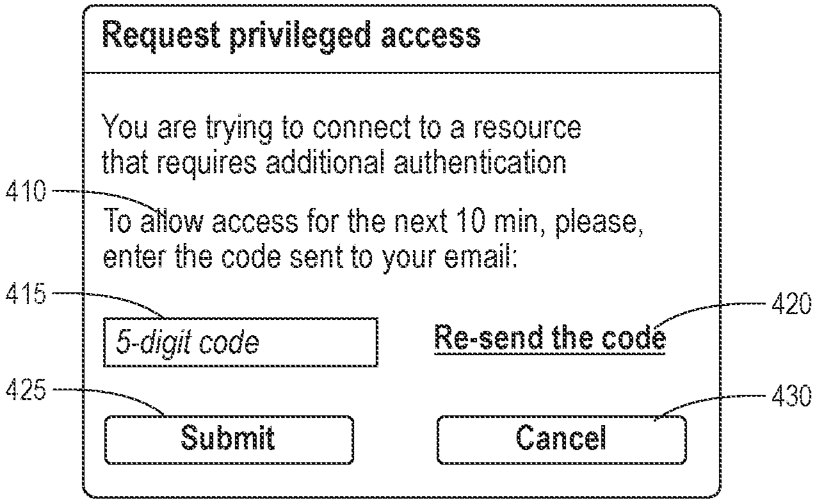
FIG. 4*a* illustrates a message containing a user interface for performing additional authentication after initiating the request to access a protected resource in accordance with an embodiment of the present invention.

FIG. 4*a* illustrates a message that may be transmitted by the system to the user, such as to the user's device with data input by the user and/or user interactions being transmitted by the user device to the system. The message contains a user interface for performing additional authentication after initiating the request to access the protected resource.

In the depicted embodiment, the system, after determining that the data exchange initiated by the user needs additional authentication (see step 315), starts this process by sending a verification code to the user's email, SMS, or other communication modality, before providing the UI of FIG. 4*a* to confirm this code. The user can enter the code into interface element 415 and select "Submit" 425, select element 420 to request re-sending of the code, or refuse to be authenticated by selecting "Cancel" 430.

In this example, the user has requested privileged access that requires frequent re-authentication. The message includes interface element 410 that informs the user that access with this verification code will only be allowed for 10 minutes. In other instances, additional authentication may remain valid for a longer time—for instance, until the end of the remote access session.

In some instances, the system does not initiate the requested action but enables users to do so on their own. In one example, the user is requested to enter the passcode displayed by the hardware authenticator. In other examples, the user is provided with a link to request the verification code, or to perform additional authentication with the Identity Provider. In some implementations, different means of additional authentication may be requested at different times—for instance, asking to enter the verification code in one message, and then asking for biometrics in another message.

Figure 4B:
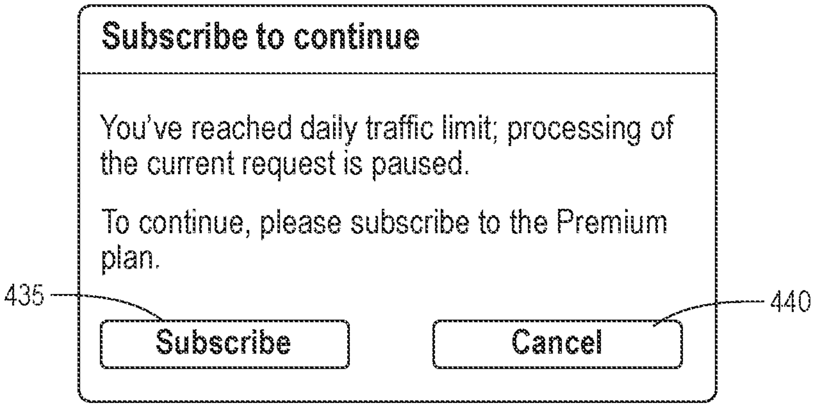
FIG. 4*b* illustrates a message informing the user of the need to perform a subscription to continue the data exchange over the computer network between the user's device and the networked resource in accordance with an embodiment of the present invention.

FIG. 4*b* illustrates a message that may be transmitted by the system to the user, such as to the user's device with data input by the user and/or user interactions with the message being transmitted by the user's device to the system. The message may inform the user of the need to pay for a subscription to continue the data exchange over the computer network between the user's device and the networked resource.

In the depicted embodiment, the user can initiate the subscription process by selecting "Subscribe" 435, or refuse to do so by selecting "Cancel" 440.

In one instance, selecting "Subscribe" opens a web app specializing in processing payments, which, after confirming the payment, sends a callback to the system that issued the message. In other instances, the user obtains the payment receipt and includes it with the response.

In some embodiments, the request to perform an action is sent by the system after the amount of the sent or received data has reached the pre-defined size, instead of being sent immediately after the data exchange was initiated. In this example, the request was triggered by the total amount of daily traffic, not by the specific parameters of the detected data exchange. In other instances, the request is sent immediately after the data exchange that requires specific action is initiated—for instance, if the user requests to access the resource only available for paying users.

In some embodiments, the message sent to the user combines a request to provide information about the initiated data exchange, and a request to perform specific action. In some instances, the message interface combines UI elements depicted in some or all of FIG. 2*a*, FIG. 2*b*, FIG. 4*a*, and FIG. 4*b*.

Figure 5:
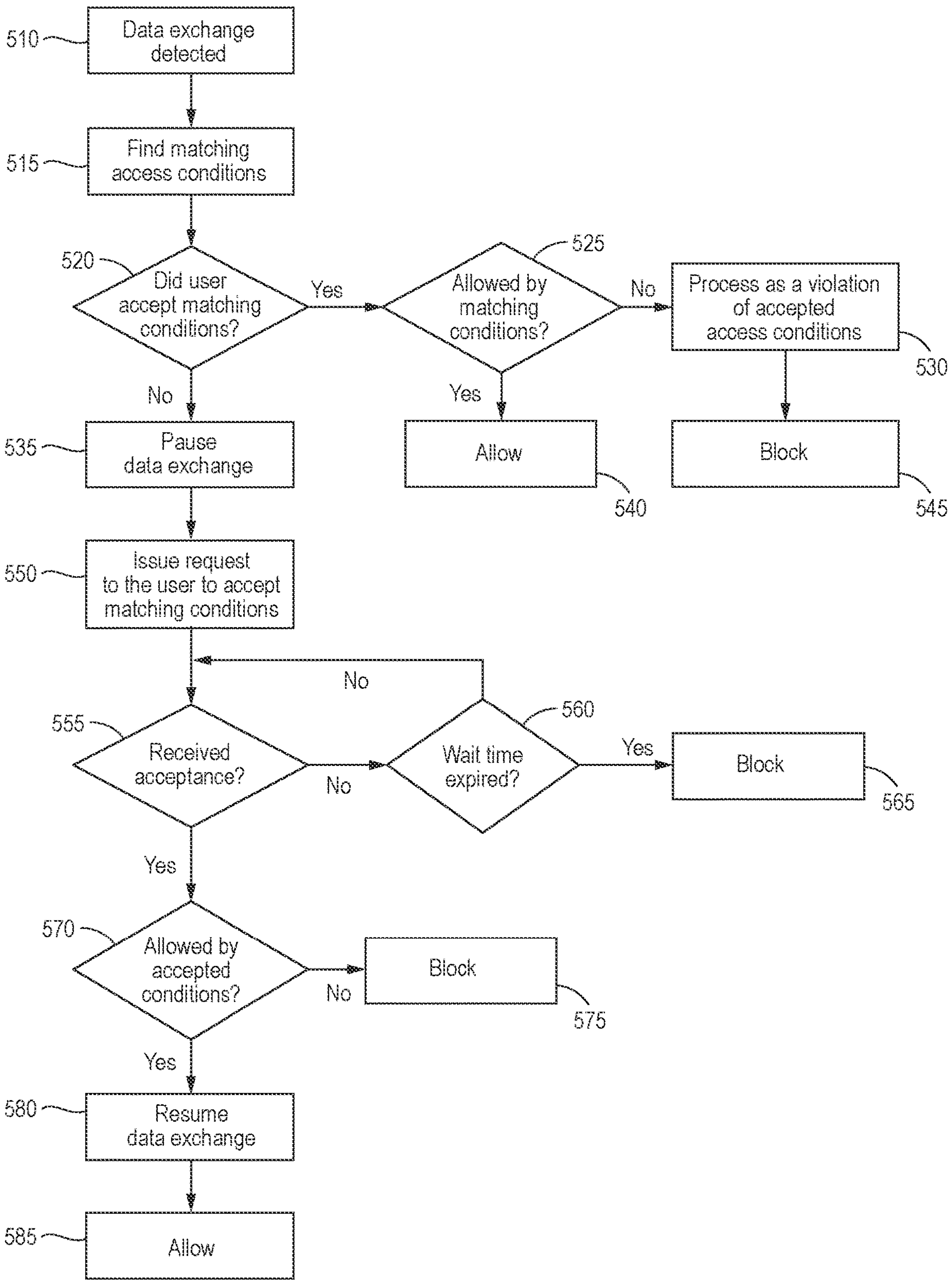
FIG. 5 is a flowchart illustrating a method for enabling the user to acknowledge the access conditions allowing the data exchange over the computer network between the user's device and the networked resource in accordance with an embodiment of the present invention.

FIG. 5 is a flowchart illustrating a method for enabling the user to acknowledge acceptance of the conditions allowing the data exchange over the computer network between the user's device and the networked resource. Requiring the user to acknowledge acceptance of the access conditions accordingly to the present invention, instead of just allowing or blocking the user's access attempts, decreases the probability that the user will perform the unauthorized request in the future and makes it easier to detect suspicious requests initiated without the user's involvement—for instance, ones caused by the malware on user's device. In the provided description, the accepted conditions or acknowledged conditions refer to the conditions whose acceptance was acknowledged by the user, which may include any of the access conditions or required actions described above with respect to FIGS. 1 and 3.

In the depicted embodiment, the computing system detects 510 the data exchange between the user's device and a networked resource over the computer network, finds 515 access conditions matching this data exchange, and checks 520 whether the user has already accepted the matching conditions. If the matching conditions are already accepted, the system checks 525 if the matching conditions allow the detected data exchange and, if so, allows 540 the detected data exchange. If the user has accepted the matching conditions but violated them by initiating the data exchange that was not allowed by the matching conditions, the system processes 530 this as a violation in addition to blocking 545 the data exchange. In some instances, processing as a violation includes logging, sending an alert, increasing the user's risk score, or performing another action that would be different from the one performed for the users who did not previously accept the violated conditions.

If the user has not yet accepted the matching conditions, the system pauses 535 the data exchange and then issues 550 a request to accept these conditions. The system then waits 555 for a response and, if acceptance is not received 560 within the allowed time, blocks 565 the data exchange.

If the user's acceptance is received within the allowed time, the system checks 570 whether the data exchange is allowed according to the matching conditions. If the data exchange is not allowed according to the matching conditions, the system blocks 575 the data exchange. If the data exchange is allowed according to the matching conditions, the system resumes 580 the paused data exchange and allows the data exchange to proceed 585.

In the depicted embodiment, the request to accept matching conditions is sent even if the matching conditions allow the data exchange detected at step 510. This functionality is useful to inform the user about the matching conditions without waiting for unauthorized access attempts. In other embodiments, the request is sent only for unauthorized access attempts, which decreases workflow interruptions but makes it more difficult to detect the requests initiated without the user's involvement.

In some embodiments, the data exchange is not paused 535 while waiting for the user's acceptance. The data exchange will continue if allowed or will be blocked if acceptance is not received 555 within the allowed time.

Figure 6A:
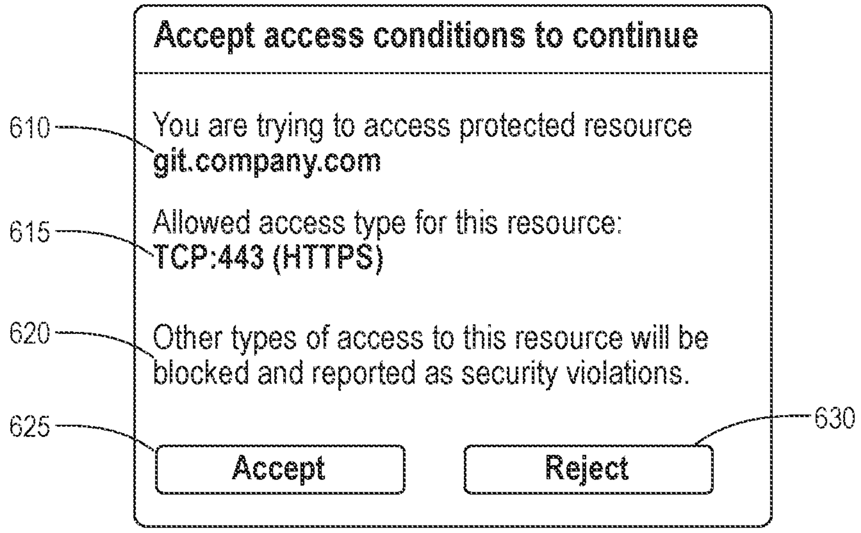
FIG. 6*a* illustrates a message containing a user interface for accepting access conditions allowing the data exchange over the computer network between the user's device and the networked resource, the message being sent after the user has initiated the data exchange in accordance with an embodiment of the present invention.

FIG. 6*a* illustrates a message that may be transmitted by the system to the user, such as to the user's device with data input by the user and/or user interactions with the message being transmitted by the user's device to the system. The message contains a user interface for accepting conditions for allowing the data exchange over the computer network between the user's device and the networked resource, the message being sent after the user has initiated the data exchange.

The message displays a domain 610 of the requested resource and information 615 about an allowed access type. The message further includes a warning 620 that enumerates the consequences of using unauthorized access types for the networked resource. The user can select "Accept" 625 to acknowledge the information, or "Reject" 630 if, for instance, that message was sent in error. In some instances, the message is sent even if the requested access type is allowed.

Figure 6B:
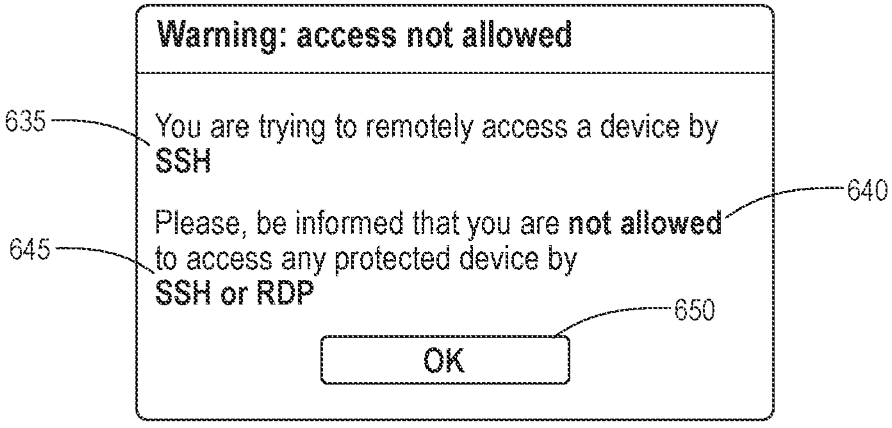
FIG. 6*b* illustrates a message informing the user about the types of access blocked by the access conditions set for the data exchanges over the computer network between the user's device and the networked resources, the message being sent after the user has initiated the data exchange in accordance with an embodiment of the present invention.

FIG. 6*b* illustrates a message illustrates a message that may be transmitted by the system to the user, such as to the user's device with data input by the user and/or user interactions with the interface being transmitted by the user's device to the system. The message may be transmitted after the user has initiated the data exchange, the message informing the user about the types of access blocked by the access conditions set for the data exchanges over the computer network between the user's device and the networked resource.

The message displays information 635 about the attempted access type, a notification 640 that informs the user that this access type is not allowed, and a listing 645 of unauthorized access types. In the depicted implementation, there is only one option to respond to this message by selecting "OK" 650 to end display of the message on the user's device.

The message in this example is sent after the user has issued an unauthorized request. Blocking secure shell (SSH) and remote desktop protocol (RDP) requests for all data exchanges helps to prevent the bypass of the access conditions that could happen if the user connects to an unauthorized resource through the SSH or RDP application installed on the authorized resource.

In some implementations, the data exchange is allowed after receiving the confirmation that the user was informed about the access conditions, instead of receiving the user's acknowledgment of these conditions. In some examples, this confirmation is obtained by detecting that the message was displayed while the user was interacting with the computer screen or that the user has opened an email containing the message with the access conditions.

In the embodiments depicted in FIG. 6*a* and FIG. 6*b*, the request to acknowledge access conditions is sent after detecting 510 the data exchange. Embodiments presented in FIGS. 7*a*, 7*b*, 7*c*, 7*d*,8*a*, 8*b*,8*c*, and 8*d* illustrate user interfaces that enable user participation in setting access conditions before initiating the affected data exchange.

Figure 7A:
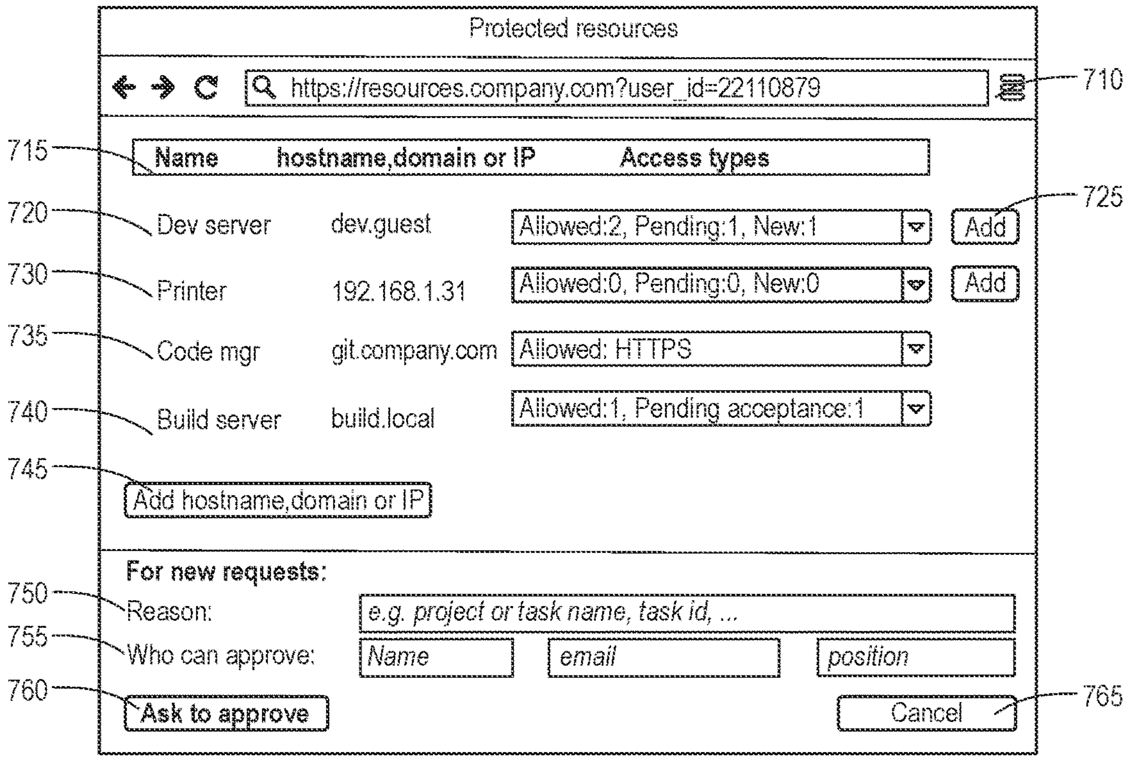
FIG. 7*a* illustrates a user interface for requesting and accepting access conditions to allow data exchanges over the computer network between the user's devices and the networked resources, matching specific protocols and ports in accordance with an embodiment of the present invention.

FIG. 7*a* illustrates a user interface that may be transmitted by the system to the user, such as to the user's device with data input by the user and/or user interactions with the user interface being transmitted by the user's device to the system. The user interface enables requesting and accepting conditions to allow data exchanges with networked resources matching specific protocols and ports. In the depicted embodiment, the user opens a web page at location 710 specific to the user's identifier (ID), intending to see the list of accessible protected networked resources and participate in setting access conditions for accessing the protected networked resources.

In this example, each resource has information 715 associated therewith, such as a name, a reference to a resource location (hostname, domain, or IP address), and a list of access types. Examples of access types may include "allowed," "pending approval or acceptance," or "new" (specified but not yet submitted for approval).

To be accessible, the networked resource may be required to have at least one allowed or accepted access type. The user can add new access types for some networked resources using interface element 725, such as access types for the networked resources 720 and 730. In some embodiments, other allowed networked resources, such as those represented by interface elements 735 and 740are displayed but adding of new access types is not allowed. Some networked resources, such as those represented by interface element 740, require the user to accept corresponding access conditions, others, such as those represented by interface element 735, don't require the user to perform any additional action to allow access.

In the depicted embodiment, the user can add new networked resources using interface element 745 and then request needed access types for the new networked resources. In other embodiments, the user is enabled to submit requests for updating information about some or all networked resources, for instance, to change their IP addresses, or to remove some networked resources from the presented list. This allows the user to participate in setting the list of required resources and promptly react to the dynamic network changes (adding or removing the networked resource, moving the networked resource to another subnet, etc.). In some instances, the user's request for updating the networked resource's information such as the IP address, domain, or hostname is verified by the system by checking that the networked resource is accessible when using the updated information.

In the depicted embodiment, the user is enabled to provide the reason in interface element 750 to add to new requests (e.g., project name, task ID, etc.) and an interface element 755 to receive input of an identifier of a person who can approve the new requests (team lead, manager, etc.). The user can submit or cancel new requests using interface elements 760 and 765, respectively. In this example, after the user selects the interface element 760 labeled "Ask to approve," all new requests change their status to "Pending." After that, the user can add another set of new requests associated with a different reason or approver's name. If the user selects the interface element 765 labeled "Cancel", all new requests are deleted or otherwise ignored, but "pending" requests remain waiting for approval.

In other examples, the user can separately ask to approve each new request, with its reason and the approver's name.

In some embodiments, different identifiers or input fields can be omitted (for instance, name, reason, etc.), or added (for instance, displaying both domain name and IP address).

In some embodiments, the list of available resources and their access types is presented as part of the application's UI on the user's device. In other embodiments, this information can be split between multiple pages: for instance, resources that allow user participation in setting their access conditions, such as interface elements 720 and 730, could be displayed separately from the interface elements representing networked resources that don't permit user's requests, such as interface element 735.

Figure 7B:
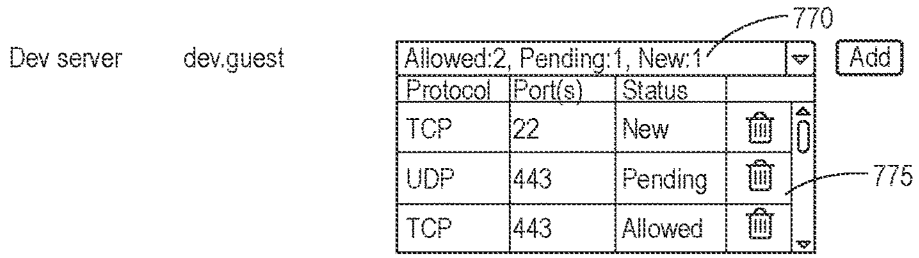
FIG. 7*b* illustrates a user interface for reviewing the status of requested access conditions to allow data exchanges over the computer network between the user's devices and the networked resource in accordance with an embodiment of the present invention.

FIG. 7*b* illustrates a user interface that may be transmitted by the system to the user, such as to the user's device with data input by the user and/or user interactions with the user interface being transmitted by the user's device to the system. FIG. 7*b* illustrates a user interface for reviewing the status of requested access conditions to allow data exchanges over the computer network between the user's devices and the networked resource. In the depicted instance, the user opens drop-down list 770 to see protocols, ports, and status for the access types associated with a specific networked resource. Each access type can be deleted by selecting a corresponding interface element 775 without changing the status of other access types. In this example, the newly added access type is TCP:22, which may be used to bypass an access conditions by connecting to other networked resources through the SSH tunnel to the networked resource. To prevent this, in some implementations, the networked resource with SSH or RDP access is prevented from communicating with other networked resources, for instance, by placing the networked resource inside a VLAN associated with a "guest" Wi-Fi access point that isolates networked resources connected to this access point from each other.

Figure 7C:
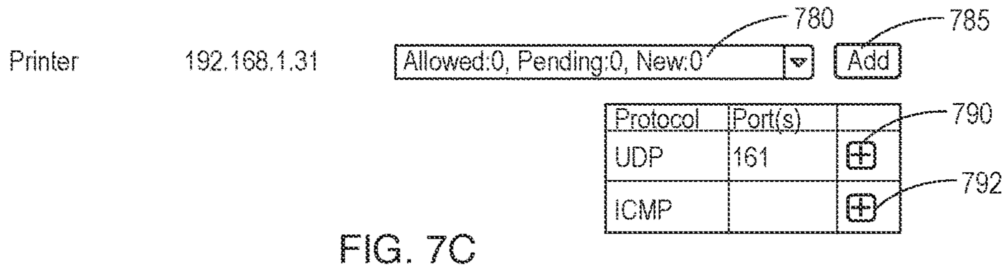
FIG. 7*c* illustrates a user interface for adding new requests to set the access conditions for allowing data exchanges over the computer network between the user's devices and the networked resource in accordance with an embodiment of the present invention.

FIG. 7*c* illustrates a user interface that may be transmitted by the system to the user, such as to the user's device with data input by the user and/or user interactions with the user interface being transmitted by the user's device to the system. FIG. 7*c* illustrates a user interface for adding new requests to set the conditions for allowing data exchanges over the computer network between the user's devices and the networked resource. In this example, no access types are yet specified. A drop-down menu 780 remains disabled until at least one access type is added. Selecting the "Add" button 785 opens popup 790, which displays a list of access types that can be individually added using interface element 792.

In some implementations, the user is only allowed to add access types from the pre-existing list, for example, ones specified by the Admin for the user's role, or available for a specific networked resource. The user is expected to only request the needed access types, instead of automatically gaining permission to use all types specified by the Admin or available for the networked resource. This both decreases the attack surface and simplifies the initial setup. For instance, the Admin may create a single list for the larger user group or a role. This approach is much simpler than creating multiple lists closely tailored to small groups of users and then requiring each user to specify only networked resources and access types they need.

In another instance, the user is enabled to add requested access types by directly specifying their parameters, such as protocol and port, list of ports, or a port range. In some instances, the user is both presented with a pre-existing list and enabled to add other access types.

In some embodiments, the rules set by the Admin or specified by the user can include different or additional parameters, for instance, the number of bytes for uploads and downloads, maximal throughput, requested quality of service, days of the week, or times of the day, etc. For example, the Admin could provide a pre-defined rule "TCP: 443 and bytes <1 MB", which the user could change and submit for approval.

Figure 7D:
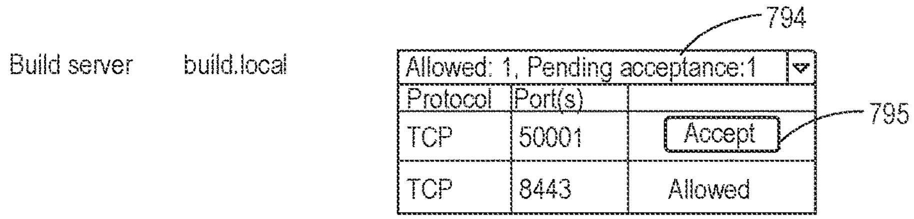
FIG. 7*d* illustrates a user interface for accepting access conditions to allow data exchanges over the computer network between the user's devices and the networked resource in accordance with an embodiment of the present invention.

FIG. 7*d* illustrates a user interface that may be transmitted by the system to the user, such as to the user's device with data input by the user and/or user interactions with the user interface being transmitted by the user's device to the system. FIG. 7*d* illustrates a user interface for accepting conditions to allow data exchanges over the computer network between the user's devices and the networked resource. In the depicted example, drop-down menu 794 shows the total number of allowed access types for the selected networked resource (ones that were previously accepted by the user), and the total number of access types pending user's acceptance. In this example, the user must select "Accept" 795 for each presented access type to change its status to "Allowed".

In other embodiments, the user is only required to select a single button to accept all presented conditions for one or all displayed resources; however, this can make it less certain that the user has reviewed presented access conditions before accepting them. In some instances, the common "Accept" button remains disabled until the user reviews all access types that need acceptance—for example, by expanding and scrolling corresponding drop-down menus.

Figure 8A:
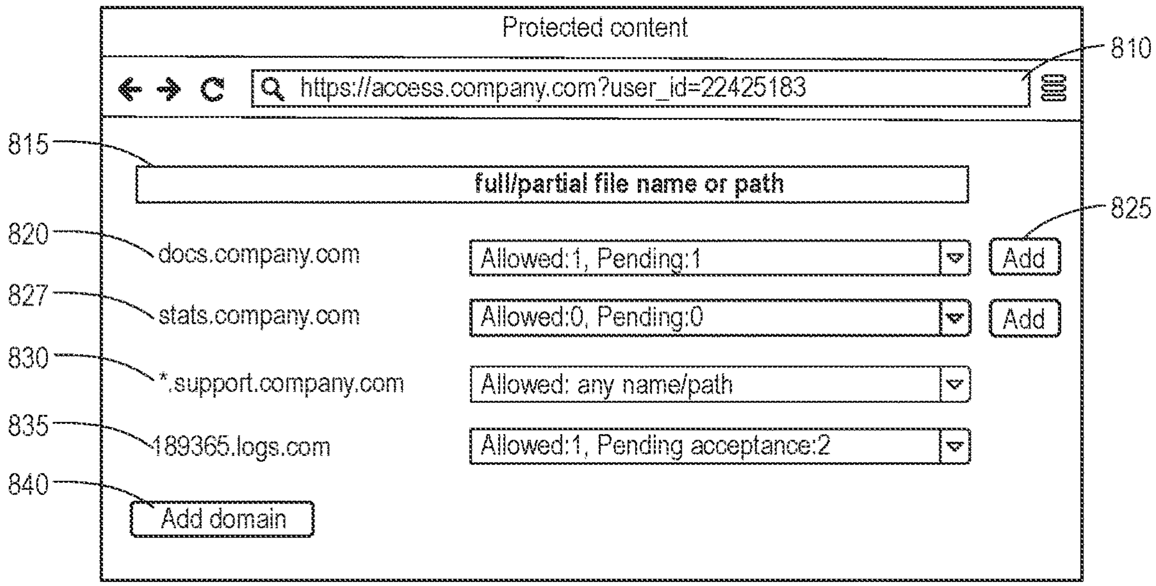
FIG. 8*a* illustrates a user interface for requesting and accepting access conditions to allow data exchanges identified by domain and a full or partial name or path of the content exchanged with the networked resource in accordance with an embodiment of the present invention.

FIG. 8*a* illustrates a user interface that may be transmitted by the system to the user, such as to the user's device with data input by the user and/or user interactions with the user interface being transmitted by the user's device to the system. FIG. 8*a* illustrates a user interface for requesting and accepting conditions to allow data exchanges identified by domain and a full or partial file name or path of the requested content. In the depicted embodiment, the user opens a web page at the address 810 specific to the user's identifier (user_id), intending to see the list of accessible content items and participate in setting the access conditions.

In this example, accessible content items are identified 815 by domain and a file name or a path, either complete or partial. One partial name or path may correspond to one or more content items. In the embodiment depicted in FIG. 8*a*, the user asks to access specific content items from the selected domain, instead of asking to use specific ports and protocols as illustrated by FIG. 7*a*.

In some embodiments, to be accessible, the domain is required to be associated by the system with at least one allowed or accepted content item. The user can add new content items using interface element 825 for some domains, such as those represented by interface elements 820 and 827; other domains, such as those represented by interface elements 830 and 835, may only display a list of allowed content items but don't allow addition of new ones. Some domains, such as that represented by interface element 835, require the user to accept allowed content items, while others, such as that represented by interface element 830, don't require the user to perform any additional action to allow access.

In the presented example, domains represented by interface elements 820, 827, and 835 are Fully Qualified Domain Names (FQDNs), containing both the hostname and a domain name. A domain represented by interface element 830 contains a wildcard that can be replaced by any subdomain. In other examples domain, partial file name, or path may include elements of regular expressions such as wildcards at different positions, numbers of wild characters, etc. The domain represented by interface element 830 is also an example where access to all of the content items of the domain is allowed for the current user.

In some implementations, the full or partial file name or a path used by the system to approve or reject the user's request does not affect the access conditions checked in real-time for detected data exchanges according to the methods described herein. For instance, if content for a specific domain is accessed over an HTTPS connection, the file name or path of the content can't be determined if the system doesn't have the encryption key for the HTTPS connection. In some instances, the approved content identifiers are compared with the ones stored in content server logs of the system after related data exchanges are completed, to determine whether the user has accessed some content items without asking for approval.

In the depicted embodiment, the user can add a new domain using interface element 840 and then specify needed content items using the interface of FIG. 8*a*. In other embodiments, the user is enabled to submit requests for updating information about some of the domains, for instance, to change their subdomains, or for removing some domains from the presented list.

In the depicted embodiment, each change made by the user is immediately propagated to the system controlling the access conditions without the need to select the "Submit" button. Accordingly, there is no need for the "New" (specified but not yet submitted) status: each new request is either automatically approved or acquires "Pending" status until the manual approval process is completed.

In some embodiments, rejected requests to allow the access type or a content identifier are also counted and displayed with the corresponding status, for instance, a user interface element displaying this information. In some instances, rejection information is supplemented by a reason, a request for more information (for instance, for an exact link to the task description), or a description of an appeal procedure (for instance, "send an email to your supervisor to request the access to this content").

In some embodiments, access conditions requested or accepted by the user may combine access types (protocols, ports, bytes up, bytes down, days of the week, time of day, etc.) and content identifiers. For instance, access conditions for some content items may have low upload limits for users with read-only permissions.

Figure 8B:
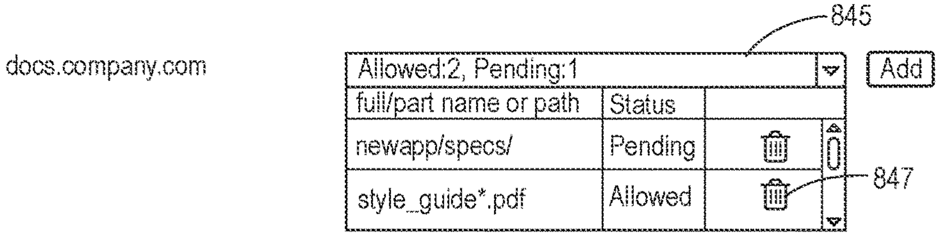
FIG. 8*b* illustrates a user interface for reviewing the status of requested access conditions to allow data exchanges identified by domain and a full or partial name or path of the content exchanged with the networked resource in accordance with an embodiment of the present invention.

FIG. 8*b* illustrates a user interface that may be transmitted by the system to the user, such as to the user's device with data input by the user and/or user interactions with the user interface being transmitted by the user's device to the system. FIG. 8*b* illustrates a user interface for reviewing the status of requested access conditions to allow data exchanges identified by domain and a full or partial name or a path of the content exchanged in the data exchanges with the networked resource. In this instance, the user opens drop-down list 845 to see requested or allowed content identifiers. Each item in the drop-down list 845 can be deleted by selecting interface element 847 without changing the status of other items. In this example, the user has recently asked to allow access to files from docs.company-.com, referenced by the URLs with the path containing "newapp/specs," for instance, ones stored in the subdirectory newapp/specs. The user has also asked earlier, and was allowed to access, the files from docs.company.com matching names style_guide*.pdf—for instance, style_guide_desktop.pdf.

Figure 8C:
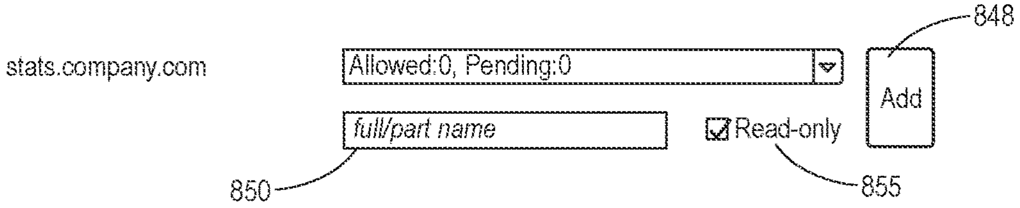
FIG. 8*c* illustrates a user interface for adding requests to specify the full or partial name or path for allowed data exchanges with the networked resource associated with the specified domain in accordance with an embodiment of the present invention.

FIG. 8*c* illustrates a user interface that may be transmitted by the system to the user, such as to the user's device with data input by the user and/or user interactions with the user interface being transmitted by the user's device to the system. FIG. 8*c* illustrates a user interface for adding requests to specify the full or partial name or path for allowed data exchanges with the networked resource associated with a specified domain. In this implementation, selecting the "Add" button 848 triggers the display of the input field 850 for receiving input of a needed content identifier. In this example, the user can also uncheck box 855 (checked by default) to request write permissions. In other examples, the user is enabled to specify a maximal requested upload or download sizes, the expiration time of requested access permission, etc.

Figure 8D:
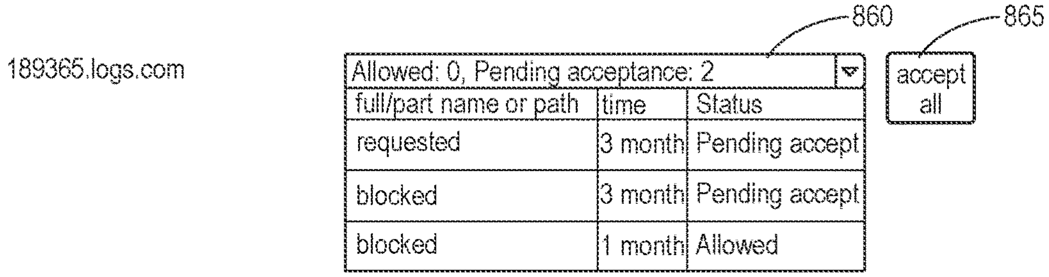
FIG. 8*d* illustrates a user interface for accepting access conditions to allow data exchanges identified by domain and a full or partial name or path of the content exchanged with the networked resource in accordance with an embodiment of the present invention.

FIG. 8*d* illustrates a user interface that may be transmitted by the system to the user, such as to the user's device with data input by the user and/or user interactions with the user interface being transmitted by the user's device to the system. FIG. 8*d* illustrates a user interface for accepting conditions to allow data exchanges identified by domain and a full or partial name or a path of the content exchanged with the networked resource. In this implementation, drop-down list 860 shows the total number of allowed content identifiers and the ones that the user must acknowledge as allowed before issuing content requests. In this instance, the user is allowed to access the files stored on a log server and organized by event types (requested, blocked). In this example, the access is granted for a limited time: the user was previously allowed to access blocked events for 1 month and will be allowed to access both requested and blocked events for 3 months upon accepting these updated permissions. In this example, the user can select button 865 to accept all updated permissions for this domain, which may be immediately reported to the system, which will then update the access conditions and the "Pending acceptance" status would change to "Allowed." In other implementations, there could be a delay between accepting granted permissions in the interface of FIG. 8*d* and changing the status to "Allowed," for instance until the information about the user's acceptance is propagated to a service database.

In some embodiments, one or more pieces of information needed to evaluate the access conditions are hidden from the user while other information is presented before the related data exchanges are initiated. In some instances, one or more networked resources identified by domains, hostnames, and/or IP addresses are not presented. In other instances, one or more access types or content items associated with presented networked resources remain hidden. In some implementations, hidden items are not allowed to be accessed by the specific user or user group, and the user is not allowed to request access. Withholding information about such permanently blocked resources, access options, or content items is useful for decreasing the attack surface. In other implementations, access to some of the hidden items is allowed, but the user would have to know about their existence from the other channels (for instance, from the task description) or a prior history. This is useful for gradual transitioning from the VPN to the implementation of ZTNA accordingly to the embodiments disclosed herein. For example, the Admin can start the transition by blocking some networked resources while presenting them and allowing the users to request access; access to other resources would remain allowed as if through the legacy VPN without presenting them to the user.

In some implementations, hiding the information before detecting the related data exchange referencing the information does not prevent the user from requesting or accepting access conditions after the related data exchange is detected. In one example, after initiating access to an unlisted resource, the user receives a request to provide the reason why it should be allowed.

In some instances, the request to provide the information about the detected data exchange is not sent if the user has reviewed the access conditions for this data exchange before it was detected. In some implementations, the system stores the information about the items that were presented to the user as eligible for approval requests even if the user did not ask for their approvals and then refrains from asking the user for information after detecting the related data exchange. In some examples, the item is considered presented to the user if the user has triggered an action to display this item, such as expanding the collapsed list or selecting a drop-down list.

In some embodiments, the information presented before initiating the related data exchanges contains items referring to the actions that must be performed to allow these data exchanges. In some implementations, these actions include additional authentication, subscription, or acknowledgment of the access conditions or allowed content types. In some instances, these actions are listed per networked resource, per access type, or content item. In one example, access to specific domains is only allowed for premium users. In another example, access to specific content items is only allowed if MFA was performed within the last 10 minutes or some other pre-defined time period.

One of the problems of the current approaches to access control, such as ZTNA and SASE, is the difficulty of deciding whether or when to block access to allowed but unused networked resources. Blocking access to recently unused networked resources would be wrong if these networked resources are needed at the later stages of the user's project or task. However, continuing to allow access to unused networked resources may increase the attack surface and cause an unnecessary increase in the number of access rules when new networked resources are added to the list.

In some embodiments, the user is enabled to provide information about previously set access conditions that were not used to allow any data exchanges between the user's device and the networked resource during the specified period. In some implementations, this information is used to determine whether to remove or modify the unused access conditions. In some instances, the requested information contains user feedback on whether the unused access condition can be removed from the set of access conditions allowing one or more data exchanges.

These embodiments enable users to take responsibility for matching accessible networked resources to their current needs, contributing to network security and reducing workflow interruptions.

Figure 9:
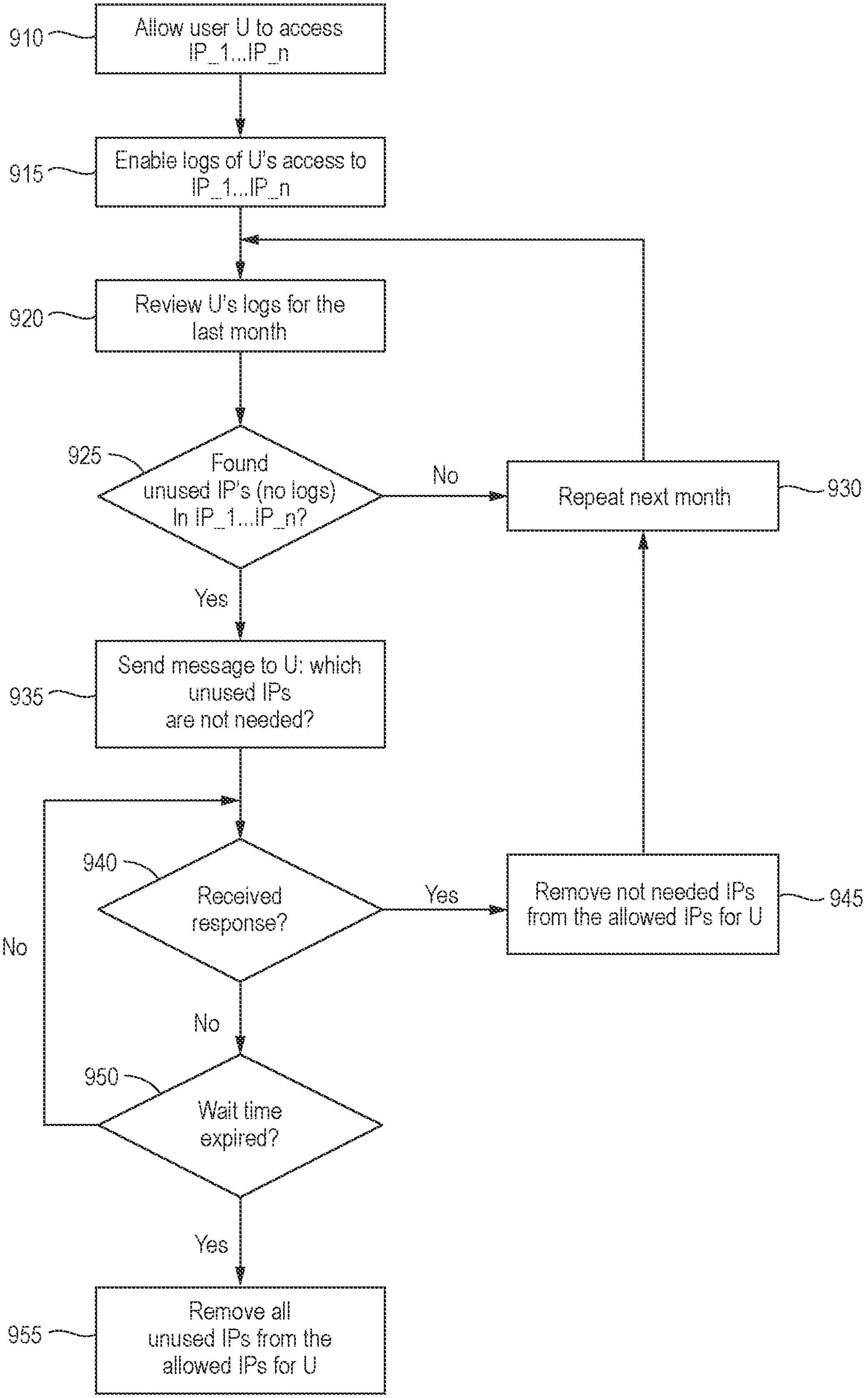
FIG. 9 is a flowchart illustrating a method for removing unused access conditions to allow data exchange over the computer network between the user's device and the networked resource in accordance with an embodiment of the present invention.

FIG. 9 is a flowchart illustrating a method for removing unused conditions to allow data exchange over the computer network between the user's device and the networked resource.

In the depicted embodiment, some of the access conditions are set 910 to allow the data exchanges between the user's devices and protected networked resources associated with IP addresses IP_1 . . . IP_n. The system enables logging 915 of the data exchanges between users' devices and these IP addresses. After reviewing 920 logs for a specified period (e.g., a month), the system checks 925 whether some of these IPs remained unused (no logs found) for the specified period. If no unused IPs are found, the system repeats check 930 after the next time interval. If one or more unused IPs are found, the system sends 935 a message to user 935, the message asking which unused IPs can be removed from the allowed list. If the user's response is received 940 and lists one or more not needed IPs, the system removes 945 these IPs from the allowed list. If no response is found 950 to have been received within a pre-defined time period, the system removes 955 all unused IPs from the allowed list.

In other embodiments, if no response is found 950 to have been received within the pre-defined time period, the system keeps unused IPs in the allowed list to decrease the possibility of removing needed IPs. In some implementations, workflow interruptions caused by removing needed IPs are reduced by enabling the user to again request access to the blocked IP after initiating the data exchange.

Figure 10:
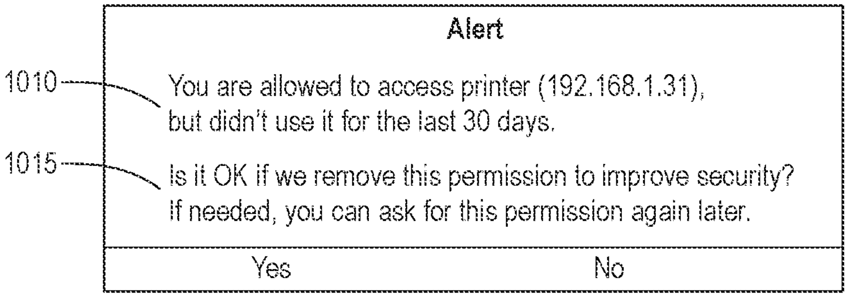
FIG. 10 illustrates a message containing a user interface for removing unused access conditions to allow data exchange over the computer network between the user's device and the networked resource in accordance with an embodiment of the present invention.

FIG. 10 illustrates a user interface that may be transmitted by the system to the user, such as to the user's device with data input by the user and/or user interactions with the user interface being transmitted by the user's device to the system. FIG. 10 illustrates a message containing a user interface for removing unused conditions to allow data exchange over the computer network between the user's device and the networked resource.

In the depicted embodiment, the message is presented as an alert 1010, informing user that an allowed networked resource wasn't used for 30 days. In this example, the networked resource is an office printer identified by its IP address.

The message includes a question 1015 asking the user whether it's OK to block access to the unused resource, justifying it by the need to improve network security. The user's "Yes" or "No" answer to the question 1015 is reported back to the system.

In some implementations, one or more access conditions to allow one or more data exchanges are set without knowing whether these data exchanges would be initiated in the future. In other implementations, access conditions to allow the data exchange are set after the data exchange is initiated; these access conditions can be removed if the allowed data exchange is not repeated within the pre-defined time period (see step 950).

In some embodiments, unused access conditions that allow one or more data exchanges are selected from the group of hostname, domain name, IP address, port, and protocol. In some implementations, unused access conditions that allow one or more data exchanges include content identifiers selected from the group of the full or partial path and the file name.

In some implementations, instead of completely removing unused access conditions, existing access conditions are modified to decrease the set of allowed data exchanges. In some instances, the existing access conditions are made less permissive by adding one or more limitations. In some examples, these limitations are selected from the group of the number of bytes transmitted during a data exchange, days of the week, and times of the day. In other examples, these limitations increase the specificity of the content identifiers—for instance, to match the full path or a file name instead of matching the partial name or a path.

In some instances, removed unused access conditions are replaced by other access conditions. In one example, if the IP of an unused networked resource has changed from IP_x to IP_y in the middle of the pre-defined time period, the condition to allow IP_x is removed and the condition to allow IP_y is added (and may also be removed, if not used during the next pre-defined time period).

In some embodiments, instead of analyzing the logs, the system keeps track of unused access conditions by accessing the pre-processed information provided over the computer network. In one example, this information is the list of files accessed over the pre-defined period, provided by the content server.

Figure 11A:
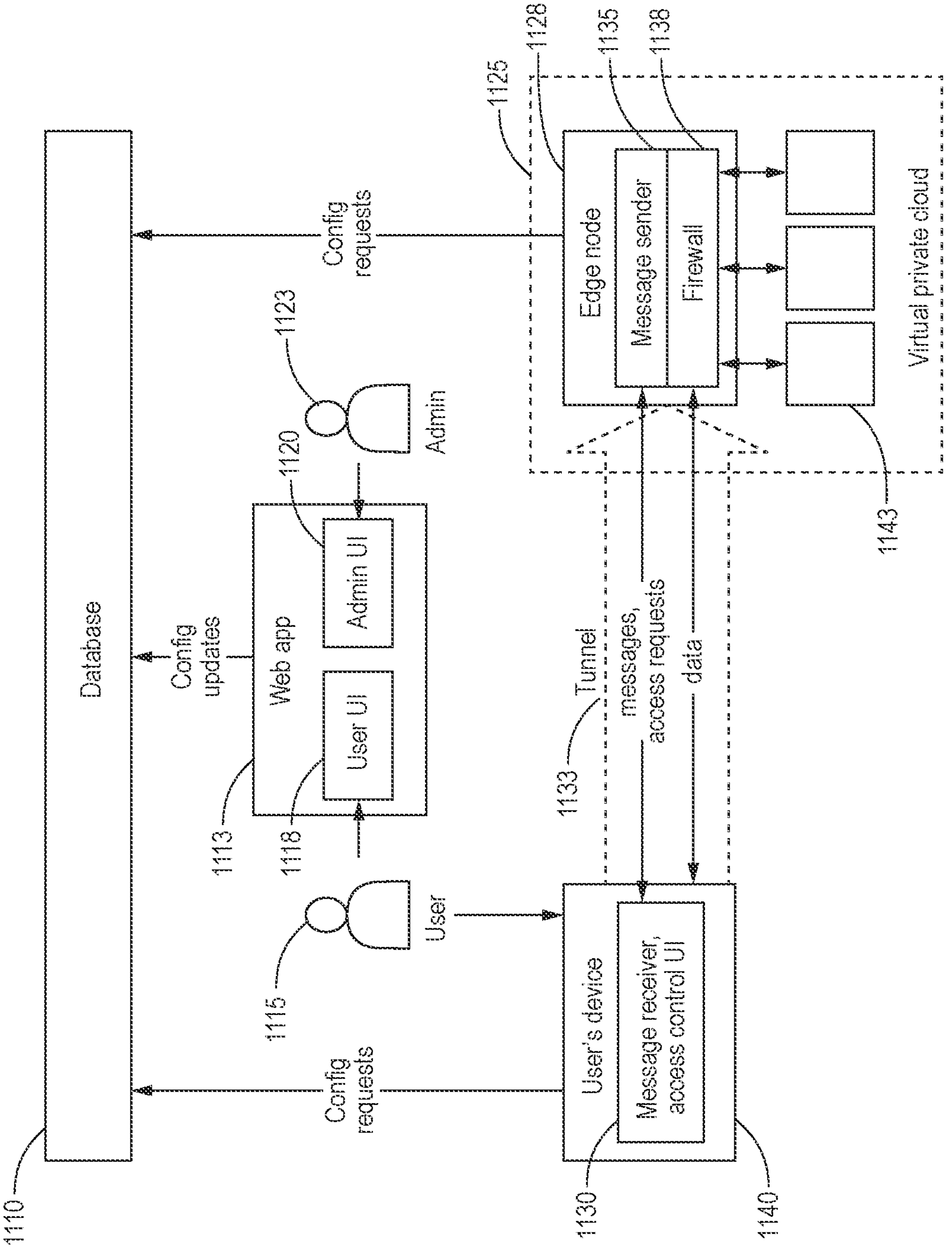
FIG. 11*a* is a block diagram of a system for remotely accessing protected resources and exchanging access control messages over a tunnel between the user's device and an edge node local to the protected resources in accordance with an embodiment of the present invention.
Figure 11B:
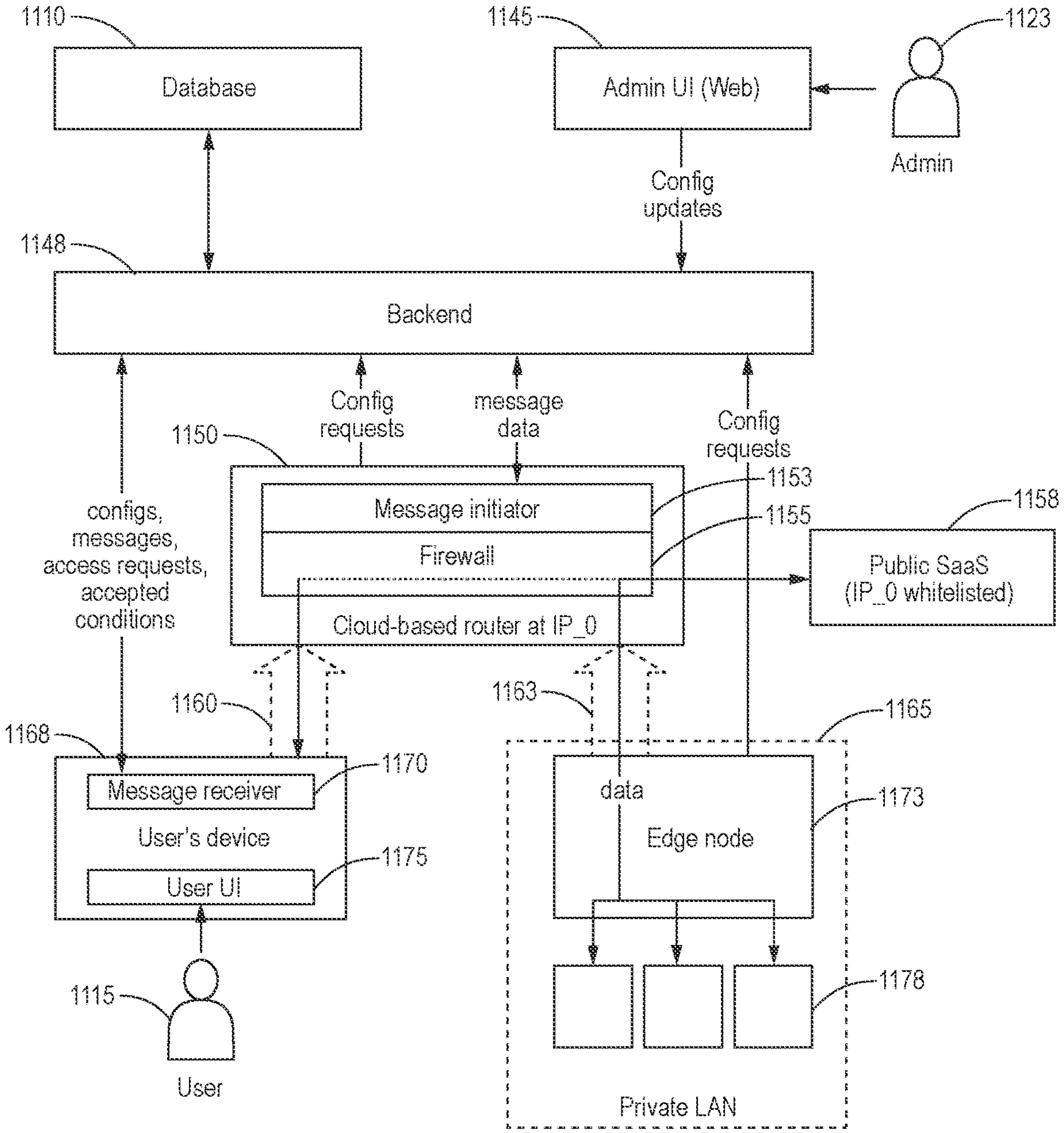
FIG. 11*b* is a block diagram of a system for remotely accessing protected resources and software as a service (SaaS) through a cloud-based router and firewall while exchanging access control messages between the user's device and a backend server controlling the configuration of the system's components in accordance with an embodiment of the present invention.
Figure 11C:
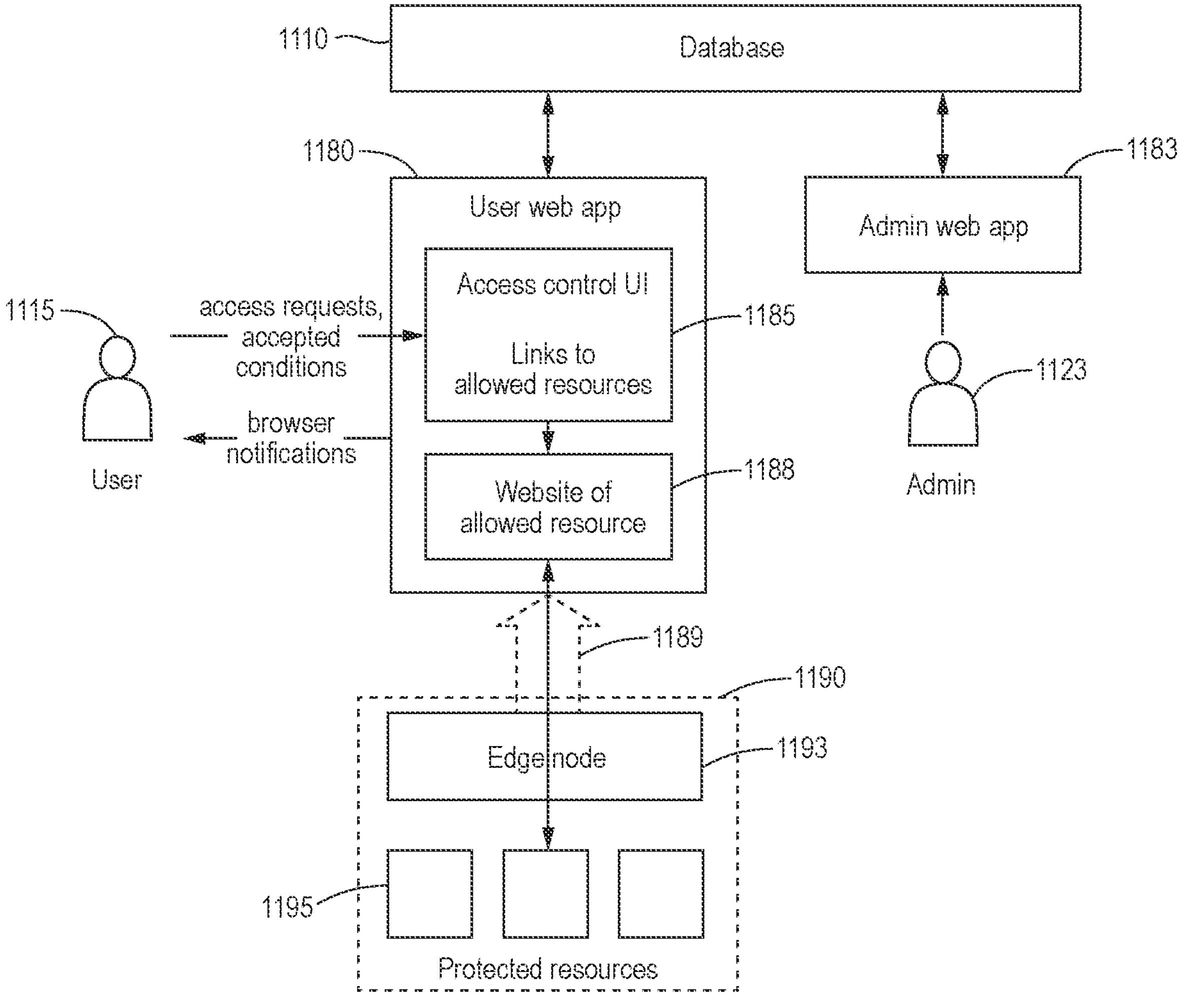
FIG. 11*c* is a block diagram of a system for remotely accessing protected resources and exchanging access control messages through a web application without installing dedicated software on the user's device in accordance with an embodiment of the present invention.

FIG. 11*a*, FIG. 11*b*, and FIG. 11*c* depict different system embodiments of the present invention. The different system embodiments implement access conditions for the protected networked resources and the exchange of the messages needed to enable the user's participation in setting the access conditions.

FIG. 11*a* is a block diagram of a system for remotely accessing protected networked resources and exchanging access control messages over a tunnel between the user's device and an edge node local to the protected networked resources.

In the depicted embodiment, the system's components communicate with each other over one or more computer network. The system's components include a database 1110, a web app 1113, and the edge node 1128. The user's device 1140 communicates with some or more of the system's components over the one or more computer networks.

Database 1110 stores information including the access conditions for the data exchanges between the user devices 1140 and protected networked resources. The web app 1113 may contain a user UI front end 1118 and an admin UI front end 1120 for setting and updating the access conditions. A user 1115 interacts with the user UI front end 1118 to review or accept existing access conditions and request new ones; the Admin 1123 interacts with admin UI front end 1120 to set or update access conditions and approve or reject user's requests.

The edge node 1128 may be deployed inside a virtual private cloud 1125, where the edge node 1128 has direct access to its protected networked resources 1143. In some implementations, the edge node 1128 and the protected resources have local IP addresses within the same subnet of a local area network (LAN). In other implementations, the protected networked resources have local IP addresses in different subnets but are accessible by the edge node 1128.

In this embodiment, the web app 1113, the user device 1140, and the edge node 1128 periodically send requests to the database 1110 to obtain configuration parameters, such as parameters for performing functions described above with respect to FIGS. 1 to 10. After the user's device 1140 and the edge node 1128 are configured and become active, the user's device 1140 waits for user 1115 to issue the command to connect to edge node 1128. In the depicted implementation, the edge node 1128 is accessible using a public IP address thereof; the public IP address may be reported to the database 1110 and provided to the user's device 1140 as part of configuration of the user's device 1140.

In one instance, the user 1115 selects the edge node 1128 from a list presented on the user's device 1140, which initiates the opening of a VPN tunnel 1133 from a VPN client on the user's device 1140 to a VPN server on the edge node 1128. Requests to access protected networked resources 1143 initiated from the user's device 1140 are routed through tunnel 1133 to the edge node 1128, which forwards the requests to the protected networked resources 1143 and routes responses from the protected networked resources back to the user's device 1140 through the tunnel 1133. This enables the data exchange between the user device and the protected networked resources 1143 as if the protected networked resources 1143 are located inside the same LAN. In some implementations, the edge node 1128 includes a firewall 1138, which applies access conditions to at least some of the data exchanges initiated by the user, such as access conditions according to any of the methods disclosed herein. In some instances, the firewall is implemented as a collection of the iptables chains. The chains contain entries that match the virtual source IPs associated with user devices 1140, destination IPs associated with protected networked resources 1143, or other parameters such as destination protocols, ports, and amounts of traffic. Each match of a data exchange to an entry triggers a corresponding action specified in the entry: allow, drop, log, return to the parent chain, etc. In other instances, the firewall is implemented using nftables or as custom modules inside a kernel or in a user space of an operating system of the edge node 1128.

According to the present invention, the system also includes components for exchanging the messages needed to enable users' participation in setting the access conditions. In the depicted embodiment, the edge node 1128 includes a message sender 1135 and the user's device 1140 includes a message receiver and access control UI module 1130. In some implementations, the message sender 1135 generates messages and performs other actions depicted in FIG. 1, FIG. 3, FIG. 5, or FIG. 9. The generated messages may be sent through the tunnel 1133 to the module 1130 on the user's device 1140. In some implementations, module 1130 presents received messages as depicted in FIG. 2*a*.FIG. 2*b*, FIG. 4*a*, FIG. 4*b*, FIG. 6*a*, FIG. 6*b* or FIG. 10, and then reports responses to the presented messages received from the user 1115 back to the edge node 1128. The edge node 1128 sends the information obtained from the user's response to the database 1110 and, if needed, updates the access conditions used by the firewall 1138.

In some instances, the messages are exchanged using a remote procedure call protocol (e.g., gRPC). In other instances, the messages are exchanged using WebSockets or representational state transfer (RESTful) application programming interface (API).

In some implementations, at least some access conditions are enforced by a firewall deployed on the user's device 1140, instead of the firewall 1138 on the edge node. These implementations are suitable for user's devices 1140 that are strongly protected from being compromised in a way that would allow an attacker to circumvent the firewall on the user's device 1140, for instance for user's devices 1140 that are fully controlled by the Admin using mobile device management (MDM). A firewall installed on the user's device is also useful to increase security by blocking malware and decreasing the amount of traffic sent through the tunnel 1133.

In some embodiments, at least parts of the user UI front end 1118, admin UI front end 1120, and the database 1110 are combined with the edge node 1128. In some implementations, the edge node 1128 includes the portions of the user UI front end 1118, admin UI front end 1120, and the database 1110 controlling access to the networked resources 1143 accessible by the edge node 1128 and one or more cloud-based components that are separate from the edge node 1128 include portions of the User UI front end 1118, the Admin UI front end 1120, and the database 1110 controlling access to specific edge nodes 1128. In some instances, each edge node 1128 includes a User UI front end 1118 and Admin UI front end 1120 accessible over HTTPS, without the need to deploy an external User UI front end 1118, Admin UI front end 1120, or database 1110.

In some instances, the edge node 1128 is combined with the user's device 1140, to simplify its deployment and improve ease of access. In one example, the user's device 1140 is a Linux laptop that is also enabled to function as an edge node 1128. The user 1115 can establish connections to the other edge nodes 1128 to gain access to their allowed networked resources 1143. Other users 1115 can establish connections to allowed networked resources inside the network local to the user's edge node 1128.

FIG. 11*b* is a block diagram of a system for remotely accessing protected resources and SaaS through the cloud-based router and firewall while exchanging access control messages between the user's device and the backend server controlling the configuration of the system's components.

In the depicted embodiment, the system's components communicating with each other over the computer networks include a database 1110, a web app with Admin UI front end server 1145, a backend server 1148, a cloud-based router 1150, and an edge node 1173. The components may communicate with a user's device 1168 over one or more computer networks.

The user 1115 interacts with a User UI module 1175 deployed on the user's device 1168 to review or accept existing access conditions and request new ones. The Admin 1123 interacts with a web-based Admin UI front end server1145 to set or update access conditions and approve or reject user's requests.

The edge node 1173 is deployed inside a private LAN 1165, where the edge node 1173 has direct access to its protected networked resources 1178.

In this embodiment, the Admin UI front end server 1145, the user device 1168, the edge node 1173, and the cloud-based router 1150 periodically send requests to the backend server 1148 to obtain their configuration parameters. The backend server 1148 provides the information received in the requests to the database 1110 and receives information for responding to the requests from the database 1110.

In the depicted implementation, the cloud-based router 1150 is accessible over a public IP address IP_0. This public IP address is reported to the database 1110 through the backend server 1148 and then provided to the user's device 1168 and the edge node 1173. The edge node 1173 is not accessible using the public IP address. After the edge node 1173 is configured and becomes active, a VPN client on the edge node 1173 opens a tunnel 1163 to a VPN server on the cloud-based router 1150 that listens on the IP_0.

After the user's device 1168 is configured and becomes active, the user's device 1168 waits for user 1115 to issue a command to connect to edge node 1173. After receiving this command, the VPN client on the user's device 1168 opens a tunnel 1160 to the same VPN server on the cloud-based router 1150 as tunnel 1163.

The block diagram also includes an instance of a business-oriented web application 1158, for example, a SaaS app 1158 provided by the 3$^{rd}$ party as Software-as-a-Service (SaaS)—such as a cloud-based document manager or code repository with version control. Some business-oriented web apps support IP whitelisting: the ability to limit access to a few specific source IP addresses, for instance, the public IP address of the company's office, or an IP address of the VPN server used by the company's remote employees. This decreases an attack surface by making sure that only workers authorized to use VPN or to enter the office can access the web app. In the depicted embodiment, the web app 1158 has whitelisted IP address of the cloud-based router 1150 IP_0.

In the described embodiment, the user can access protected networked resources 1178 by specifying private IP addresses of the networked resources 1178 or access the SaaS app 1158 by specifying a public IP of the SaaS app 1158. Requests to networked resources 1178 and SaaS app 1158 may be sent through the tunnel 1160 to the cloud-based router 1150. The cloud-based router terminates the tunnel 1160 and routes the traffic to the edge node 1173 connected to the requested private IPs of the networked resources 1178, or to the public internet if the user has sent a request to the public IP address. The traffic to the edge node 1173 is sent through its tunnel 1163. The edge node 1173 forwards the user's traffic to one of the networked resources 1178 with the private IP address specified in the user's request. The response from a networked resources 1178 is sent back through tunnel 1163 to the cloud-based router 1150, which forwards the response to the user's device through tunnel 1160.

The request to the SaaS app 1158 is sent from the user's device 1168through the tunnel 1160 to the cloud-based router 1150. The request is then forwarded by the cloud-based router 1150 over the public internet. A response to the request from the SaaS app 1158 is forwarded back through tunnel 1160 to the user's device 1168. The access conditions are enforced by a firewall 1155, which detects at least parts of the data exchanges between the user's device 1168 and requested networked resource 1178 that are observable outside of the VPN tunnels 1160 and 1163.

In comparison with the embodiment depicted in FIG. 11*a*, the embodiment depicted in FIG. 11*b* allows access to the edge node 1173 without opening any ports on a local router of the edge node 1173 for incoming traffic, making the edge node 1173 invisible to external scans. The embodiment of FIG. 11*b* also shifts enforcement of the access conditions from the edge node 1173 to the cloud, which simplifies and speeds up the rule updates and logging of traffic-related events. However, the embodiment depicted in FIG. 11*b* doesn't preserve end-to-end encryption and may increase access latency if the cloud-based router 1150 is located far from the user's device 1168 and the edge node 1173 or the closest SaaS server 1158.

In some embodiments, the system further exchanges the messages needed to enable users' participation in setting the access conditions. In the depicted embodiment, the cloud-based router 1150 includes a message initiator 1153 and the user's device 1168 includes a message receiver 1170 and a user UI module 1175.

In the depicted embodiment, the message initiator 1153, upon determining the need to issue a request for additional information, pauses the detected data exchange and sends message data and parameters to the backend server 1148. The backend server 1148 uses this information to generate the message and sends the message to the message receiver 1170. In this embodiment, the message to the user's device is forwarded over the public internet, instead of being sent through the tunnel 1160.

The message receiver 1170 provides the message to the User UI module 1175, which displays the message as depicted in FIG. 2*a*.FIG. 2*b*, FIG. 4*a*, FIG. 4*b*, FIG. 6*a*, FIG. 6*b* or FIG. 10, and then reports the user's responses to the backend server 1148. If needed based on the user's response, the backend server 1148 sends an update of the access conditions to the database 1110 and to the message initiator 1153.

In some implementations, the user's device 1168 or the cloud-based router 1150 opens bidirectional connections with the backend server 1148 using gRPC or WebSockets to speed up the message exchange. In other implementations, the user's device 1168 or the cloud-based router 1150 frequently polls the backend server's API over HTTPS instead of opening bidirectional connections.

In the depicted embodiments all access conditions are enforced by the cloud-based firewall 1155. In some embodiments, another firewall is deployed on the edge node 1173 ("the edge firewall"), enforcing additional access conditions. In one example, the access conditions based on matching IP addresses, protocols, ports, number of bytes, and times are enforced by the firewall 1155 on the cloud router 1150. The access conditions may be identified by the edge firewall based on matching content identifiers such as a full or partial path or a file name and enforced by the edge firewall on the edge node 1173. In one instance, the edge firewall includes a Man-in-the-Middle (MitM) proxy that is provided with transport layer security (TLS) certificates for the HTTPS domains served by the local networked resources 1178. The certificates remain stored inside the private LAN, which prevents the cloud-based router 1150 from snooping on HTTPS traffic. In other instances, MiTM proxy can be installed on the cloud-based firewall 1155, for example, if the cloud-based router 1150 and the edge node 1173 are managed by the same business entity.

FIG. 11*c* is a block diagram of a system for remotely accessing protected networked resources and exchanging access control messages through the web application without installing dedicated software on the user's device.

In the depicted embodiment, the system's components communicating with each other over the computer networks include the database 1110, a user-accessible web app 1180 which includes a VPN server, a web app 1183 which includes an Admin UI accessible by an Admin 1123, and an edge node 1193. Admin 1123 uses the web app 1183 to set or update the access conditions stored in database 1110.

In some instances, the edge node 1193 polls the database 1110 to update the configuration of the edge node 1193 in the same manner as the edge node 1128 as depicted in FIG. 11*a*. In other instances, the edge node 1128 communicates with the backend server 1148 as depicted in FIG. 11*b*. After the edge node 1193 is configured and activated, a VPN client of the edge node 1193 opens a tunnel 1189 to a VPN server deployed with the web app 1180.

Instead of interacting with the application installed on the user's device, user 1115 opens the login page of the web app 1180 in a web browser executing on the user's device. After logging in, the user is presented with an access control UI 1185, for instance, as depicted in FIG. 7*a* or FIG. 8*a*. In one implementation, identifiers of allowed resources such as their names, hostnames, domains, or IP addresses are presented as the links. In another implementation, separate links are provided for the content items associated with full URLs. Selecting the link to the allowed networked resource initiates the request to open its corresponding website 1188.

In one implementation, the access requests are sent through a tunnel 1189 to the edge node 1193, which forwards the access requests to the corresponding protected networked resource 1195, such as located inside LAN 1190, which may be directly accessible from the edge node 1193. In another implementation, the access requests are routed based on their destination IPs to one of the edge nodes 1193 that opened their tunnels 1189 to the web app 1180.

In some instances, the web app 1180 contains a firewall that filters the user's requests to prevent the user 1115 from accessing unauthorized networked resources by typing its identifier in the browser.

In some implementations, the edge node 1193 contains a firewall that filters at least some of the user's requests, for instance by using a MitM proxy with locally available TLS certificates.

In the depicted embodiment, the user 1115 doesn't need to install the application containing a VPN client on the user's device. This makes it easier for partners, vendors, or temporary workers to access allowed networked resources. However, this approach limits available access types: the protected content must be displayed inside the browser, which usually means HTTP and HTTPS websites.

In some implementations, the user is enabled to access resources over different protocols by wrapping them inside HTTP or HTTPS protocols—for instance, by using web-based SSH or RDP. In some embodiments, the resources accessible over SSH or RDP are isolated from the other networked resources to prevent bypass of the access conditions.

In some embodiments, the system is further configured to exchange the messages needed to enable users' participation in setting the access control rules, such as any of those described above with respect to some or all of FIGS. 2*a*, 2*b*, 4*a*, 4*b*, 6*a*, 6*b*, 7*a*, 7*b*, 7*c*, 7*d*, 8*a*, 8*b*, 8*c*, 8*d*, and 10.

In the depicted embodiment, the web app 1180, upon determining that there is a need to ask the user for information related to the requested data exchange, issues a browser-based notification. In some embodiments, to receive it, the user must allow notifications from the web app's domain. The notification is displayed when the browser is open, even if the web app is hidden or works in the background, for example, during the download of a large file. In some instances, the notification contains a message with a UI that enables the user's feedback; in other instances, the notification contains a link to a website with the UI that enables the user's feedback. In another embodiment, the web app 1180, upon determining that there is a need to ask the user for information related to the requested data exchange, updates currently open web page by displaying a message with the UI enabling users' feedback. In some implementations, the UI for the user's feedback is at least partially similar to the one depicted in FIG. 2*a*.FIG. 2*b*, FIG. 4*a*, FIG. 4*b*, FIG. 6*a*, FIG. 6*b*, or FIG. 10.

In some embodiments, the tunnels opened by the user's device or the edge node 1193 use VPN protocol selected from the group of OPENVPN, IPSEC, and WIREGUARD. In some implementations, VPN clients and VPN servers support multiple protocols. In some instances where the Wireguard protocol is used, the same software modules are used both for the VPN clients and VPN servers. In some examples, the same software module is used both as the VPN client and the VPN server.

Figure 12A:
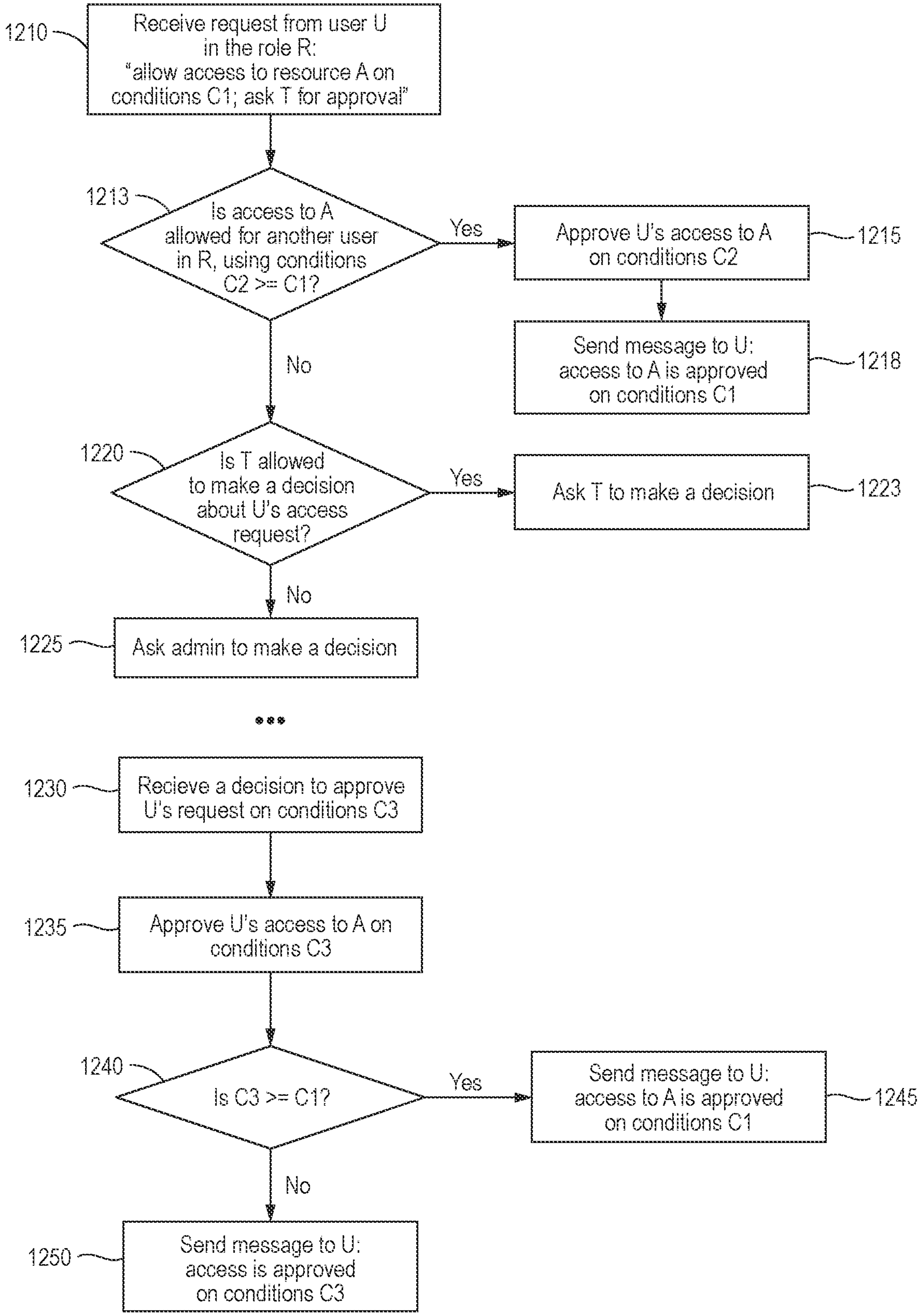
FIG. 12*a* is a flowchart illustrating a method for determining whether the user's requests to set the access conditions for allowing the data exchange can be automatically approved by comparing the user's request with pre-existing access conditions in accordance with an embodiment of the present invention.
Figure 12B:
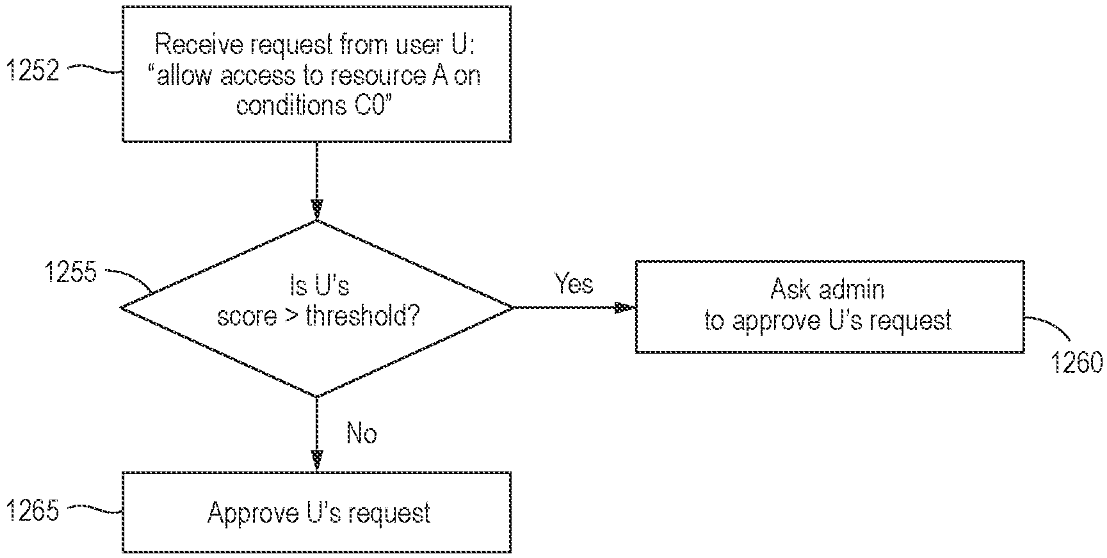
FIG. 12*b* is a flowchart illustrating a method for determining whether the user's requests to set the access conditions for allowing the data exchange can be automatically approved based on the user's score computed before the data exchange was initiated in accordance with an embodiment of the present invention.

Embodiments depicted in FIG. 12*a* and FIG. 12*b* illustrate methods to speed up the approval process for a user's request to allow one or more data exchanges over the computer network. It decreases workflow interruptions and makes user participation in setting and updating access conditions more convenient.

FIG. 12*a* is a flowchart illustrating a method for determining whether the user's requests to set the conditions for allowing the data exchange can be automatically approved by comparing the user's request with pre-existing conditions.

In the depicted embodiment, the system receives 1210 a request from user U, e.g., from a device operated by user U, to allow access to resource A, e.g., a networked resource according to any of the embodiments described herein, on conditions C1, e.g., access conditions according to any of the embodiments described herein. In one instance, this request is received in response to a message requesting information for a detected 130 data exchange, as illustrated in FIG. 1. In some examples, the user issues this request after being presented with a message depicted in FIG. 2*a* or FIG. 2*b*. In another instance, this request is received before the related data exchange is initiated. In some examples, the user asks for approval of the access conditions as depicted in FIG. 7*c*, or for approval of the access to one or more content items as depicted in FIG. 8*c*.

In the depicted embodiment, the user U who issued the request belongs to a group of users specified before the request was received. In some implementations, this group is associated with the role assigned by the Admin to one or more users for role-based access control (RBAC). After receiving the request, the system checks 1213 whether another user in the same role is already allowed access to at least resource A on conditions C2 that are the same or more permissive than the conditions C1 requested by the user (C2>=C1). For C2 to be considered more permissive, all data exchanges allowed by conditions C1 should also be allowed by conditions C2, but some data exchanges allowed by conditions C2 should be blocked by conditions C1. In one example, C2 is set to allow requests for accessing resource A by TCP protocol by ports 443 and 22, while C1 is set to allow requests for accessing A only by TCP by port 443. C1 is therefore less permissive because it would block access by TCP by port 22. In another example, the user asks to allow access on conditions C1 to the domain, hostname, or IP address of resource A by the specified protocol and port and another user from the same role is already allowed access multiple resources including resource A on conditions C2 by multiple protocols and ports, including the ones specified by the user U, making C2 more permissive than C1. In one other example, the user U asks to allow access on conditions C1 to the content item identified by its domain and exact file name and another user from the same role is already allowed access on conditions C2 to multiple content items from the same domain, the multiple content items identified by the partial file names that match the one requested by the user U.

In the embodiment depicted in FIG. 12*a*, if the system determines 1213 that another user in the same role is already allowed to access resources on conditions C2 that are the same or more permissive than C1, the system automatically approves 1215 the user's request on conditions C2, while sending a message to the user 1218 that the request is approved on conditions C1. In some embodiments, if the conditions C2 are more permissive than the conditions C1, the message does not inform the user U about one or more additionally approved conditions.

If the system determines that no other user in the same role is already allowed to access resource A on requested conditions C1, it then forwards the request to a human party.

In the depicted embodiment, the user's request includes one or more identifiers of the party that could decide whether to approve the request. In one example, the user is enabled to enter this information as depicted in FIG. 2*a*. In another example, the user enters this information when asking for approval of an access control type or a content item before the related data exchange is initiated. After receiving the identifier of the suggested party (T) that could decide whether to approve the request, the system checks whether this identifier is valid. In the depicted embodiment the system does so by checking 1220 whether the identified party is allowed to decide on the user's request. In one implementation, the system checks whether the suggested party is the senior member of the user's team, for instance, a team lead. In other implementations, the system checks whether the suggested party has contributed to setting the task specified by the user to justify the request, for instance, a product manager. In some implementations, the user's request does not include the identifier of the suggested party to approve the user's request. If such an identifier is included and determined to be valid, the system asks the identified party 1223 to decide on the user's request or, if the message does not include the identifier of the party that could approve the user's request or such identifier is determined to be invalid, the system forwards the information contained in the message to the one or more parties identified before the user's message was received. In the depicted embodiment, in this case, the system transmits 1225 a query to an Admin.

In some embodiments, different identifiers of the parties that can approve the requests are set for different users before the user's message is received. In some implementations, the user is enabled to submit an identifier of the party that could be asked to approve the request instead of the previously set identifier. In one example, previously set identifiers of the parties that can approve user requests refer to the team leads and the user includes the identifier of the task owner, for instance, a product manager, who may have better knowledge of the resources needed for the user's task.

In some implementations, the message contains identifiers of the multiple parties that can approve the requests. In some instances, the system issues the request to another such party if the first party doesn't respond within a pre-defined time. In other implementations, the system asks multiple parties to approve the user's request. In some instances, the system approves the user's request if multiple parties agree that it should be approved. In some embodiments, some of these requests are issued to the parties identified by the user, while other requests are issued to the parties set before the user's request is received. In one example, the system asks both the team lead and the Admin to approve the user's request to access privileged content and allows this access only if both approvals are received.

In the implementation depicted in FIG. 1, before receiving the decision from the human party, the system sets the access conditions to block one or more data exchanges matching the conditions requested by the user. In the embodiment depicted in FIG. 12*a*, the system receives 1230 a decision from the human party to approve the user's request on conditions C3, approves 1235 the request on these conditions, and then checks 1240 whether the conditions C3 are the same or more permissive than C1 (C3>=C1). If the system determines that the conditions C3 are the same or more permissive than C1, the system sends 1245 a message to the user that the requested conditions C1 are approved or, if the system determines that conditions C3 are less permissive than C1 (at least some of the requested conditions C1 are not approved), it sends a message 1250 that access is approved on conditions C3. In some implementations, the approval steps 1215 and 1235 are accompanied by replacing one or more stored access conditions with the approved ones.

If the access is approved for more permissive conditions than requested by the user U (C2>C1 or C3>C1), hiding this fact from the user helps to determine whether the user can correctly estimate the needed access conditions, without the need to block the allowed requests. In some implementations, the access conditions requested by the user are saved together with approved access conditions. In one example, the user requested to access resource A by HTTPS (TCP port 443) but was granted access by both HTTPS and SSH (TCP port 22). However, the system did not inform the user that access by SSH was allowed. In this case, if the user later attempts to access resource A by SSH, this request will be automatically allowed but may be logged and decrease the probability that the subsequent user's requests will be automatically approved. In some implementations, hiding that the request is allowed with more permissive conditions is accomplished without specifying which conditions are allowed. In some instances, the paused data exchange is resumed, indicating that the access is approved without sending the message to the user. In some implementations where the user's request is sent before the related data exchange is initiated, the displayed status of the request is changed (for instance, from "pending" to "allowed') to indicate the approval instead of presenting the message.

In some embodiments, the user is informed if the approved conditions differ from the requested ones, even if the approved conditions are more permissive. In one example, the approved conditions are presented instead of the requested ones before the related data exchange is initiated. In another example, the message with approved conditions is sent after the request is initiated. Informing about approval of the more permissive conditions may help convince the user to request a minimally needed set of access conditions: if more permissive conditions can be allowed, they will be approved automatically.

In some embodiments, the user's message contains information justifying the approval request. In some implementations, this information is used to determine the party who can approve the request. In one example, the user's message contains an identifier of the task that justifies the requested access, and the system determines, as the name of the party who can approve the request, the name of the person who has set this task or is responsible for controlling the resources required to perform this task.

In other instances, the system verifies the validity of the information justifying the approval request and, if this information is proven to be valid, automatically approves the request. In some implementations, verifying this information comprises issuing the request over the computer network. In one example, the system issues a request to a task management node to verify whether the provided task ID exists and whether the user is assigned to work on this task.

In some other instances, the user's message contains information proving that the user has performed the requested action; the system verifies the validity of this information; and, if it is valid, automatically approves the request. In some examples, this information is selected from the group of proof of authentication and proof of subscription.

In some implementations, the user can be assigned more than one role. In some instances, the system searches for the users with already allowed conditions in the roles assigned to the user with requested access conditions. In some instances, the system searches for users with already allowed access conditions in the one or more roles associated with the same or less permissive access conditions than the one or more roles assigned to the user with requested access conditions.

In some embodiments, the search for the users with previously allowed access conditions is limited to the users who previously issued the requests to set access conditions and had these requests approved. In other embodiments, the search for users with previously allowed access conditions is applied to the users who were assigned their access conditions without issuing the requests. In one example, the Admin assigns access conditions to one user with a specific role, while other users in the same role must issue their requests to be allowed the same access conditions.

In some embodiments, instead of limiting the search for the users with already allowed access conditions to the pre-defined group or a role, the system starts by searching for any user with already allowed access conditions that are the same or more permissive than the access conditions requested by user U. If such a user is found, the system determines whether that other user's allowed access conditions can be allowed for user U, for instance by checking whether both users work on the same task.

In one example, allowed access conditions for user U are set to be the same as already allowed access conditions for another user. In another example, allowed conditions are set to be the least permissive of the allowed conditions for another user and the requested conditions for user U.

In some implementations, instead of comparing the access conditions requested by the user U with the conditions allowed for another user, the system sets one or more access conditions for making automatic approval of the user request before this request is received and then approves the user request if previously allowed access conditions for automatic approval are the same or more permissive than the requested access conditions. In one example, the Admin sets the access conditions for the user U or the multiple users in the same role, but these conditions are not allowed until the user requests access with these or less permissive conditions.

FIG. 12*b* is a flowchart illustrating a method for determining whether the user's requests to set the conditions for allowing the data exchange can be automatically approved based on the user's score, computed before the data exchange was initiated.

In the depicted embodiment, the system receives 1252 a request from user U to allow access to resource A on access conditions C0. In this embodiment, the user or user's device is associated with a score computed before the system receives the request. The system determines 1255 whether this score exceeds a pre-defined threshold and, if true, transmits 1260 a query to the human party, e.g., the Admin, to decide whether to approve the request. If the user's score does not exceed the pre-determined threshold, the user's request is approved 1265 automatically. In the other examples, the relationship between the score and the automatic approval is reversed: the user request is approved automatically if the user's score is above the pre-defined threshold.

In some instances, this score includes an estimation of the security risk of the user or the user's device, the users with lower security risks have a higher probability of their requests being automatically approved. In some examples, estimated security risk increases if the user's device is considered unsecure, or if the current session is initiated from an insecure location, or during an unexpected time of the day or the unexpected day of the week. In other instances, this score is assigned based on the analysis of previous actions performed by the user. In one example, this analysis is performed by a Security Information and Event Management (SIEM) service.

In some instances, this score includes an estimation of the probability that the user has correctly estimated the access needs, and the users with a higher probability of correct estimation of their access needs have a higher probability of their requests being automatically approved. In some implementations, this probability is decreased for the users who initiated the data exchange violating the access conditions that were approved based on the user's prior requests. In other implementations, this probability is decreased for the users who didn't access requested resources or didn't use requested access types for the specified time.

In some instances, an algorithm different from the one comparing the score with the static threshold is used to determine whether to automatically approve the user's request. In one example, a dynamic threshold is computed based on a moving average of the user's scores for the requests previously approved by the Admin. In other instances, more than one score is computed before the system receives the user's request. In one example, the system obtains both the estimation of the user's security risk and an estimation of the probability that the user has correctly estimated the access needs, and then uses these estimations as inputs to the algorithm determining whether to automatically approve the user's request.

Setting different access conditions for the different users may increase the computing resources needed to find the access conditions specific to the user who has initiated the data exchange. This could increase processing latency or decrease the number of users supported by the available computing resource. One of the known solutions that help to decrease the required computing resources is setting the same access conditions for a group of users, such as a role assigned for the role-based access control (RBAC). the system therefore only iterates through the few roles to find the access conditions for the user who initiated the data exchange.

Some embodiments of the present invention enable users to request specific access conditions. This increases the number of variations between access conditions allowed for different users, which may negate the advantages of role-based access control.

Figure 13:
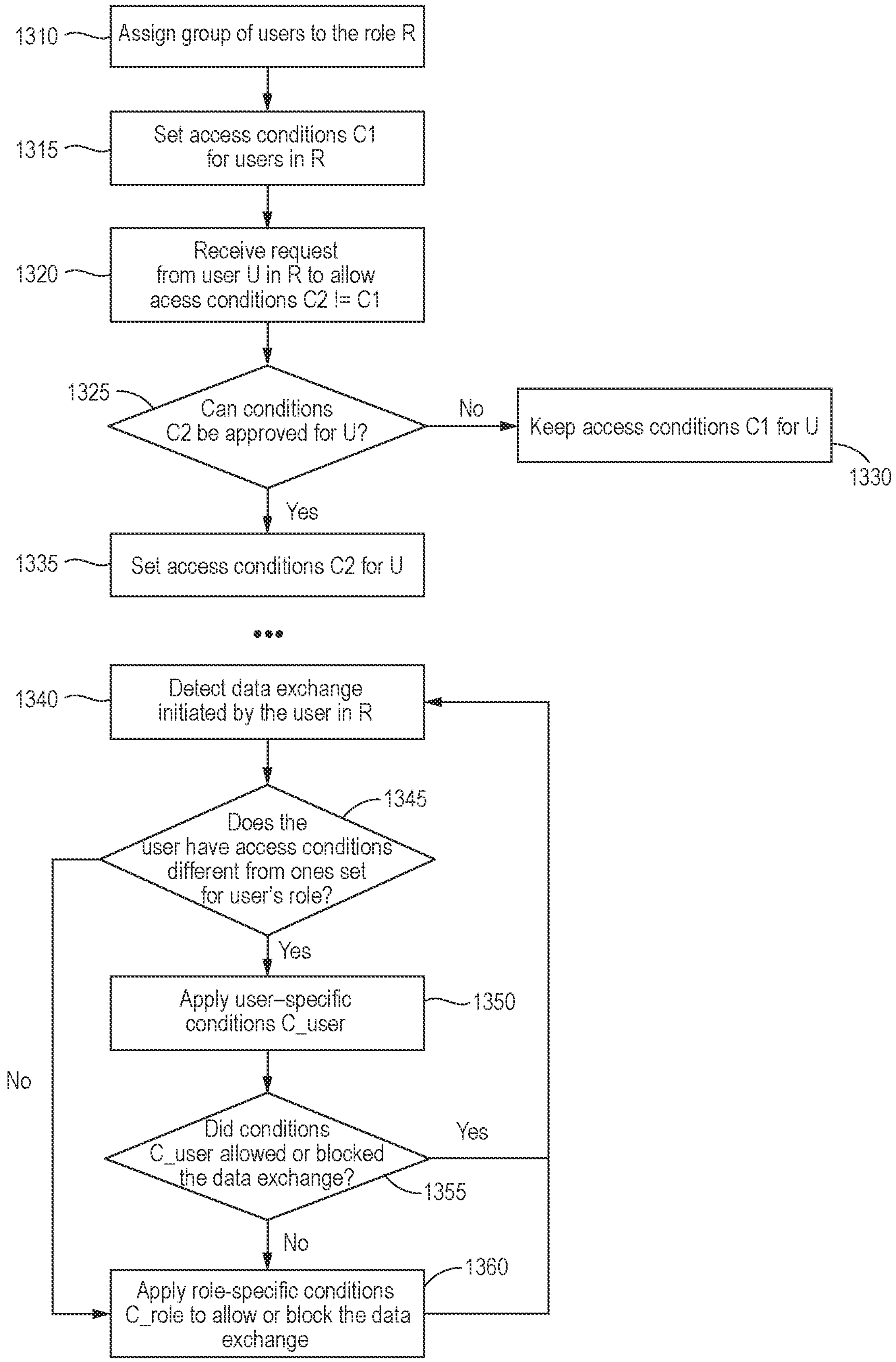
FIG. 13 is a flowchart illustrating a method for applying different access conditions for allowing data exchanges over the computer network between the user's devices and the networked resources for the different users in the same role. in accordance with an embodiment of the present invention

The embodiment depicted in FIG. 13 addresses this problem by enabling some users in the same role to have different access conditions.

FIG. 13 is a flowchart illustrating a method for applying different conditions for allowing data exchanges over the computer network between the user's devices and the networked resources for the different users in the same role.

In the embodiment depicted in FIG. 13, the group of users is assigned 1310 the same role R for the role-based access control. All users in the same role are assigned 1315 the same set of access conditions C1 for allowing or blocking the data exchanges initiated by these users. In one example, assigning a user to the role comprises using iptables to add the user's virtual source IP to the ipset associated with the role and assigning the set of conditions C1 comprises using iptables to create a custom chain to be called if the user's virtual source IP matches the role's ipset. Other examples can use nftables or custom implementations in the kernel or user space.

In the depicted embodiment, the system receives 1320 a request from the user U in the role R to allow access conditions C2 for one or more data exchanges, at least some of the access conditions C2 being different from the access conditions C1 and then determines 1325 whether the requested access conditions can be approved for U. If requested access conditions C2 cannot be approved, the system keeps 1330 the access conditions C1. If the requested access conditions C2 can be approved, the system sets 1335 the access conditions C2 for the user U without setting them for one or more other users in the role R. In other implementations, the approved access conditions are different from the requested access conditions C2, while also being different from role-based access conditions C1. In one example, the system sets user-specific access conditions to be more permissive than access conditions C2 to detect violations of the user's commitments without interrupting the workflow. In some instances, assigning the user-specific set of conditions C2 comprises using iptables to create a custom chain called if the user's virtual source IP matches the one associated with the access conditions C2. Other examples can use nftables or custom implementations in the kernel or user space.

In some implementations, the system receives the request 1320 after detecting the data exchange initiated by the user, for instance as depicted in FIG. 1. In some other implementations, the system receives the request 1320 before the user has initiated the one or more related data exchanges, for instance as depicted in FIG. 7*a*. In some embodiments, the user-specific access conditions are set for some users without receiving the user request, for instance by the Admin, and do not require additional approval.

In the depicted embodiment, after detecting 1340 the data exchange, the system checks 1345 whether the user has access conditions different from the ones set for the user's role, and, if true, obtains user-specific access conditions C_user and applies 1350 them to the detected data exchange.

In some implementations, the system adds the user with conditions different from C1 to a supplementary group, i.e., a group that is different from the group of users in role R. In these implementations check 1340 comprises determining whether the user belongs to the supplementary group. In some implementations, users in different roles having user-specific access conditions are added to different supplementary groups. In some instances, adding the user to the supplementary group comprises using iptables to add the user's virtual source IP to the ipset associated with that group. The check 1345 may include checking if the user's virtual source IP matches any of these ipsets. If the match is found, the system calls the user-specific custom chain where it sequentially compares the user's virtual source IP with IPs in the matching ipset. If the matching IP is found, the system calls the custom chain containing the rules for user-specific access conditions C_user.

In some implementations, the system applies user-specific access conditions C_user by sequentially evaluating entries in the custom chain containing the user-specific access conditions C_user; it determines 1355 that access conditions C_user have allowed or blocked the data exchange if one or more parameters of the data exchange (for instance, the destination IP address) matched the entry that caused allowing or blocking the data exchange (for instance, had a target ACCEPT, DROP or REJECT). If the detected data exchange was allowed or blocked by access conditions C_user, the system stops checking the access conditions for at least part of the detected data exchange, without checking the access conditions C1 for the user's role.

If the user didn't have access conditions different from the access conditions C1 set for the user's role, or the user-specific conditions C_user did not allow or block the detected data exchange, the system applies 1360 role-specific conditions C_role to allow or block the data exchange. In some implementations, the system calls a custom chain containing access conditions C_role if no user-specific conditions were found, or if the custom chain with access conditions C_user returned control to its parent chain, instead of allowing or blocking the data exchange. In some instances, check 1345 is performed before the user's role is determined, and the system attempts to find conditions C_role only if the data exchange can't be allowed or blocked by the user-specific access conditions C_user.

In some implementations, the role-specific conditions C_role are always set to allow or block the data exchange, for instance by adding a rule to allow or block all data exchanges that were not allowed or blocked by any other access conditions. In other implementations, the same user is assigned more than one role and, if the data exchange wasn't allowed or blocked by the user-specific conditions C_user, the access conditions C_role for these roles are applied one after another. In some instances, the user is assigned more than one set of user-specific conditions C_user, and these sets are applied before determining whether to apply role-specific conditions C_role.

Described embodiments enable combining user-specific and role-specific access conditions; if user-specific access conditions can't allow or block the data exchange, the role-specific conditions are applied even if they were changed after the user-specific conditions were set. For instance, if the user-specific conditions were set for resource A but ignored resource B, the data exchange with resource B will be allowed or blocked by the role-specific conditions. This simplifies storing and accessing user-specific conditions: user-specific conditions are only stored for the subset of all data exchanges matching role-specific access conditions. If the number of users with conditions different from the role-based conditions is significantly smaller than the total number of users, the described embodiments decrease the amount of computing resources needed for the access control: finding the role-specific access conditions takes a smaller number of attempted matches with user's virtual source IP than finding the user-specific access conditions.

Figure 14:
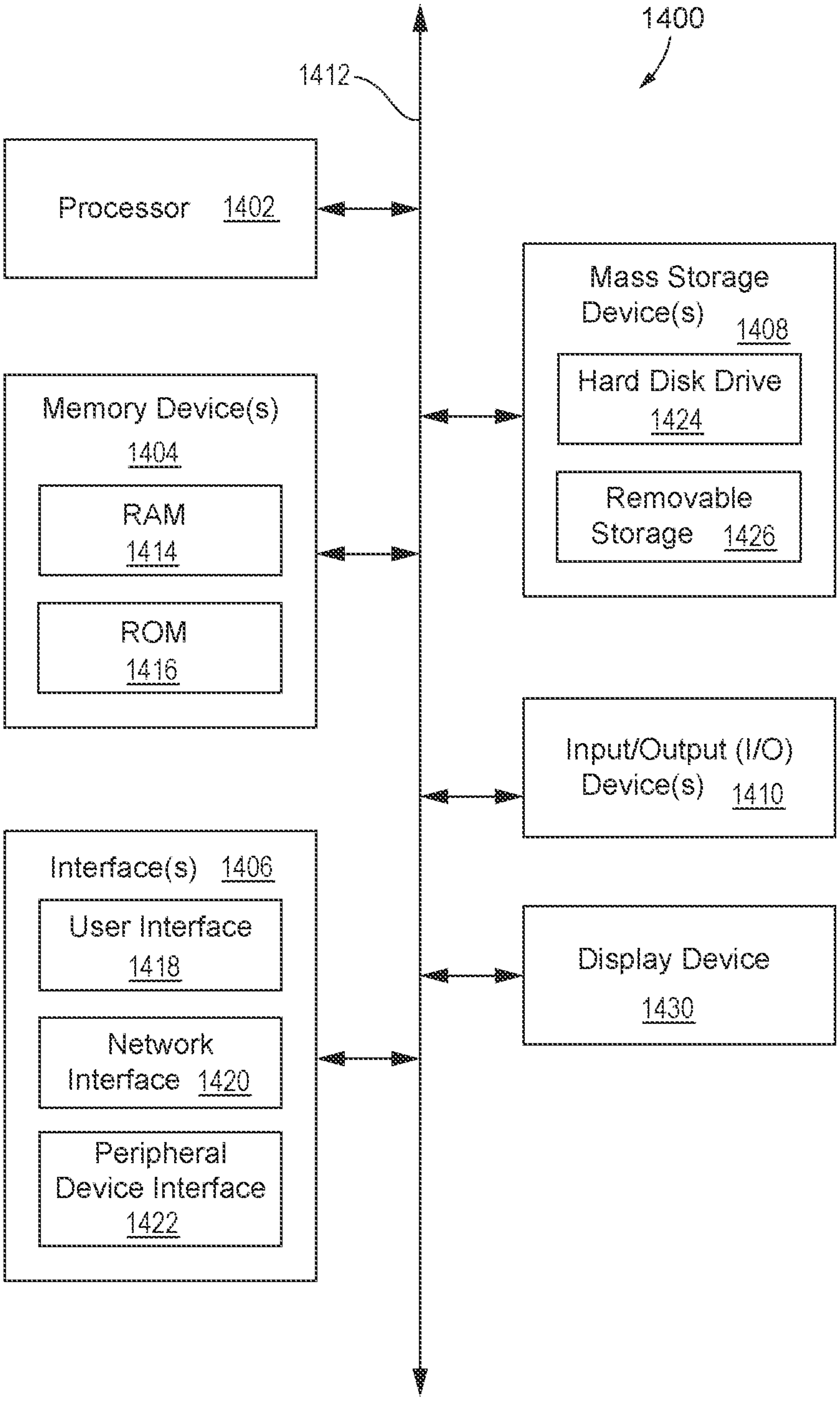
FIG. 14 illustrates an example computing device that may be used to implement a system, a user's device, or any computing device or component described herein.

FIG. 14 illustrates an example computing device 1400 that may be used to implement a system, a user's device, or any computing device or component described herein. In particular, components described above as being a computer or a computing device may have some or all of the attributes of the computing device 1400 of FIG. 14. FIG. 14 is a block diagram illustrating an example computing device 1400 which can be used to implement the systems and methods disclosed herein.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for controlling access comprising:

detecting, by a computer system, at least part of a first data exchange between a device of a first user and a first resource over a computer network;

issuing, by the computer system, a request to the first user to provide requested information related to the first data exchange, the requested information including at least a requested portion of an identifier of the first resource;

receiving, by the computer system, a response to the request from the first user, the response including the at least the requested portion of the identifier of the first resource; and using, by the computer system, the response to determine whether to allow or block the first data exchange.

2. The method of claim 1, wherein the at least the requested portion of the identifier of the first resource was not available for determining whether to block or allow the first data exchange until after receiving the response.

3. A method for controlling access to networked resources comprising:

detecting, by a computer system, at least part of a first data exchange between a first user device and a resource over a computer network;

(a) throttling, by the computer system, the first data exchange without completely blocking the first data exchange; and following (a):

sending, by the computer system, a request to a first user associated with the first user device, the request being related to the first data exchange;

receiving, by the computer system, a response to the request from the first user;

determining, by the computer system, using the response, that the first data exchange is allowed to proceed; and in response to determining that the first data exchange is allowed to proceed, ceasing, by the computer system, the throttling of the first data exchange.

4. A computing system comprising:

one or more processing devices; and one or more memory devices operably coupled to the one or more processing devices, the one or more memory devices storing executable code that, when executed by the one or more processing devices, cause the one or more processing devices to:

detect at least part of a first data exchange of between a device of a first user and a first resource over a computer network;

after detecting at least part of the first data exchange, issue a request to the first user to accept or specify one or more first access conditions to access at least the first resource, the one or more first access conditions including at least one of a port, a protocol, an expiration time of the one or more first access conditions, or a full or partial resource identifier of one or more resources, the one or more resources including at least the first resource;

evaluate whether the first user has accepted or specified the one or more first access conditions; and if the first user has not accepted or specified the one or more first access conditions, block the first data exchange.

* * * * *